US006970415B1

(12) United States Patent
Galarza et al.

(10) Patent No.: US 6,970,415 B1
(45) Date of Patent: Nov. 29, 2005

(54) METHOD AND APPARATUS FOR CHARACTERIZATION OF DISTURBERS IN COMMUNICATION SYSTEMS

(75) Inventors: Cecilia Gabriela Galarza, San Francisco, CA (US); Michail Tsatsanis, Santa Clara, CA (US); Mark Alan Erickson, San Bruno, CA (US); Ioannis Kanellakopoulos, Cupertino, CA (US); James W. Waite, Los Gatos, CA (US); Ming Gu, San Jose, CA (US); Sunil C. Shah, Los Altos, CA (US); Daniel Joseph Hernandez, San Jose, CA (US); Thomas E. Paré, Jr., Mountain View, CA (US); Norman Man Leung Yuen, Cupertino, CA (US)

(73) Assignee: Tokyo Electron Limited, Tokyo (JP)

(*) Notice: Subject to any disclaimer, the term of this patent is extended or adjusted under 35 U.S.C. 154(b) by 945 days.

(21) Appl. No.: 09/710,718

(22) Filed: Nov. 10, 2000

Related U.S. Application Data

(60) Provisional application No. 60/215,543, filed on Jun. 30, 2000, provisional application No. 60/215,451, filed on Jun. 30, 2000, provisional application No. 60/215,510, filed on Jun. 30, 2000, provisional application No. 60/186,701, filed on Mar. 3, 2000, provisional application No. 60/170,005, filed on Dec. 9, 1999, provisional application No. 60/165,244, filed on Nov. 11, 1999, provisional application No. 60/164,972, filed on Nov. 11, 1999, provisional application No. 60/164,974, filed on Nov. 11, 1999, provisional application No. 60/165,399, filed on Nov. 11, 1999.

(51) Int. Cl.[7] .................................... H04J 1/12
(52) U.S. Cl. ...................... 370/201; 375/225; 375/254; 375/285; 375/346

(58) Field of Search ................................ 370/210, 285, 370/201; 375/260, 296, 254, 222, 225, 219, 375/285, 346

(56) References Cited

U.S. PATENT DOCUMENTS

| | | | |
|---|---|---|---|
| 3,814,868 | A | 6/1974 | Bradley |
| 4,649,505 | A | 3/1987 | Zinser, Jr. et al. |
| 4,669,113 | A | 5/1987 | Ash et al. |
| 4,669,505 | A | 6/1987 | Nelson et al. |
| 4,715,064 | A | 12/1987 | Claessen |
| 4,760,596 | A | 7/1988 | Agrawal et al. |
| 4,987,569 | A | 1/1991 | Ling et al. |
| 5,063,351 | A | 11/1991 | Goldthorp et al. |
| 5,157,690 | A | 10/1992 | Buttle |
| 5,226,041 | A | 7/1993 | Waclawsky et al. |
| 5,319,636 | A | 6/1994 | Long et al. |
| 5,329,547 | A | 7/1994 | Ling |
| 5,343,461 | A | 8/1994 | Barton et al. |

(Continued)

FOREIGN PATENT DOCUMENTS

EP 98/52312 A2 11/1998

(Continued)

OTHER PUBLICATIONS

Honig, M. L. et al., Suppression of Near- and Far-End Crosstalk by Linear Pre- and Post-Filtering, IEEE Journal on Selected Areas in Communications, vol. 10, Issue 3, Apr. 1992, pp. 614-629.

(Continued)

*Primary Examiner*—Min Jung
(74) *Attorney, Agent, or Firm*—Wood, Herron & Evans, L.L.P.

(57) ABSTRACT

A method and apparatus for identification of interference sources are disclosed.

40 Claims, 12 Drawing Sheets

U.S. PATENT DOCUMENTS

| | | | | |
|---|---|---|---|---|
| 5,406,552 | A | 4/1995 | Long et al. | |
| 5,483,551 | A * | 1/1996 | Huang et al. | 375/219 |
| 5,502,644 | A * | 3/1996 | Hamilton et al. | 716/5 |
| 5,521,971 | A | 5/1996 | Key et al. | |
| 5,548,222 | A | 8/1996 | Jensen et al. | |
| 5,761,614 | A | 6/1998 | Leitch et al. | |
| 5,848,151 | A | 12/1998 | Boudy | |
| 5,862,157 | A | 1/1999 | Bessios | |
| 5,880,959 | A | 3/1999 | Shah et al. | |
| 5,887,032 | A | 3/1999 | Cioffi | 375/257 |
| 5,926,538 | A | 7/1999 | Deryugin et al. | |
| 5,929,896 | A | 7/1999 | Goodman et al. | |
| 5,995,566 | A | 11/1999 | Rickard et al. | |
| 6,055,297 | A | 4/2000 | Terry | |
| 6,091,713 | A | 7/2000 | Lechleider et al. | |
| 6,144,710 | A * | 11/2000 | Chen et al. | 375/346 |
| 6,160,790 | A | 12/2000 | Bremer | 370/201 |
| 6,161,209 | A | 12/2000 | Moher | |
| 6,172,970 | B1 | 1/2001 | Ling et al. | |
| 6,195,594 | B1 | 2/2001 | Shah et al. | |
| 6,230,062 | B1 | 5/2001 | Shah | |
| 6,249,762 | B1 | 6/2001 | Kirsteins et al. | |
| 6,317,495 | B1 | 11/2001 | Gaikwad et al. | |
| 6,377,636 | B1 | 4/2002 | Paulraj et al. | |
| 6,418,175 | B1 * | 7/2002 | Pukkila et al. | 375/347 |
| 6,434,233 | B1 | 8/2002 | Bjarnason et al. | |
| 6,442,495 | B1 | 8/2002 | Fleming-Dahl | |
| 6,519,291 | B1 * | 2/2003 | Dagdeviren et al. | 375/260 |
| 6,553,075 | B1 * | 4/2003 | McGhee et al. | 375/254 |
| 6,674,815 | B2 * | 1/2004 | Zangi | 375/340 |

FOREIGN PATENT DOCUMENTS

| | | |
|---|---|---|
| EP | 98/52312 A3 | 11/1998 |
| EP | 0917314 A2 | 5/1999 |
| EP | 0917314 A3 | 10/2001 |

OTHER PUBLICATIONS

PCT Search Report Jun. 26, 2001 (5 pages).

PCT Search Report, PCT/US00/30859, Nov. 10, 2000, Date of Mailing: Mar. 27, 2001 (5 pgs.).

PCT Search Report, PCT/US00/30858, Nov. 10, 2000, Date of Mailing: Mar. 16, 2001 (7 pgs.).

PCT Search Report, PCT/US00/30887, Nov. 11, 1999, Date of Mailing: Aug. 9, 2001 (24 pgs.).

PCT Search Report, PCT/US00/30967, Nov. 10, 2000, Date of Mailing: Jan. 24, 2001 (7 pgs.).

PCT Search Report, PCT/US00/31026, Nov. 10, 2000, Date of Mailing: Jan. 22, 2001 (7 pgs.).

Petersen, Brent R., et al., "Minimum Mean Square Equalization in Cyclostationary and Stationary Interference-Analysis and Subscriber Line Calculations", Student Member, IEEE Journal, vol. 9, No. 6, Aug. 1991, pp. 11.

Valenti, Craig F., Bellcore, "Cable Crosstalk Parameters and Models", ANSI Contribution TIE1.4/97-302 Technical Subcommitte Working Group Members, Spectral Compatibility, Morristown, NJ 07960, USA, Sep. 22, 1997, pp. 8.

Lennart Ljung, IEEE Transactions on Automatic Control, vol. AC-23, No. 5, Oct. 1978, "Convergence Analysis of Parametric Identification Methods", pp 770-783.

Guanghan Xu et al., IEEE Transactions on Signal Processing, vol. 43, No. 12, Dec. 1995, "A Least Squares Approach to Blind Channel Identification", pp 2982-2993.

Alexandra Duel-Hallen et al., IEEE Transactions on Communications, vol. 37, No. 5, May 1989, "Delayed Decision-Feedback Sequence Estimation", pp 428-436.

K. Giridhar et al., IEEE Transactions on Communications, vol. 45, No. 4, Apr. 1997, "Nonlinear Techniques for the Joint Estimation of Cochannel Signals", pp 473-484.

Lang Tong et al., IEEE Transactions on Signal Processing, vol. 47, No. 9, Sep. 1999, "Joint Order Detection and Blind Channel Estimation by Least Squares Smoothing", pp 2345-2355.

Eric Moulines et al., IEEE Transactions on Signal Processing, vol. 43, No. 2, Feb. 1995, "Subspace Methods for the Blind Identification of Multichannel FIR Filters", pp 516-525.

Alexandra Duel-Hallen et al., IEEE Personal Communications, Apr. 1995, "Multiuser Detection for CDMA Systems", pp 46-58.

Upamanyu Madhow et al., IEEE Transactions on Communications, vol. 42, No. 12, Dec. 1994, "MMSE Interference Suppression for Direct-Sequence Spread-Spectrum CDMA" pp 3178-3188.

P. Ciblat et al., "Asymptotic Analysis of Blind Cyclic Correlation Based Symbol Rate Estimation", Sep. 2000.

Lennart Ljung, Prentice-Hall Information and System Sciences Series, "System Identification, Theory for the User", 1987, pp 141-163, 239-263.

ADSL Forum Technical Report TR-024 for Network Management Working Group, "DMT Line Code Specific MIB", Jun. 1999, pp 1-7.

J. Cioffi, EEE379A, Digital Communication: Signal Processing Class notes, Stanford University, pp. 167-174, 194-197.

Amit Mathur, Dissertation from Electrical and Computer Engineering, University of California, Santa Barbara, "Alogorithms for Cochannel Source Separation and Signal Estimation", Dec. 1996, pp 139-142.

D. Godard, IEEE Transaction Communications, vol. COM-28, No. 11, Nov. 1980. Self-Recovering Equalization and Carrier Tracking in Two-Dimensional Data Communication Systems, pp 1867-1875.

* cited by examiner

METHOD AND APPARATUS FOR CHARACTERIZATION OF DISTURBERS IN COMMUNICATION SYSTEMS

This application claims the benefit of the filing date of the following Provisional U.S. Patent Applications:

"IMPROVEMENTS IN EQUALIZATION AND DETECTION FOR SPLITTERLESS MODEM OPERATIONS", application Ser. No. 60/165,244, filed Nov. 11, 1999;

"CROSS-TALK REDUCTION IN MULTI-LINE DIGITAL COMMUNICATION SYSTEMS", application Ser. No. 60/164,972, filed Nov. 11, 1999;

"CROSS-TALK REDUCTION IN MULTI-LINE DIGITAL COMMUNICATION SYSTEMS", application Ser. No. 60/170,005, filed Dec. 9, 1999;

"FIXED-POINT CONTROLLER IMPLEMENTATION", application Ser. No. 60/164,974, filed Nov. 11, 1999;

"USE OF UNCERTAINTY IN PHYSICAL LAYER SIGNAL PROCESSING IN COMMUNICATIONS", application Ser. No. 60/165,399, filed Nov. 11, 1999;

"CROSS-TALK REDUCTION AND COMPENSATION", application Ser. No. 60/186,701, filed Mar. 3, 2000;

"SEMI-BLIND IDENTIFICATION OF CROSS-TALK TRANSFER FUNCTIONS", application Ser. No. 60/215,543; filed Jun. 30, 2000;

"BLIND IDENTIFICATION OF CROSS-TALK TRANSFER FUNCTIONS", application Ser. No. 60/215,451, filed Jun. 30, 2000; and "FOREIGN xDSL SERVICE TYPE DETECTION WITHIN A SHARED CABLE BINDER", application Ser. No. 60/215,510, filed Jun. 30, 2000.

FIELD OF THE INVENTION

The present invention pertains to the field of communications. More particularly, the present invention relates to identifying sources of interference.

BACKGROUND OF THE INVENTION

Communication networks are common. Most communication networks experience degradation in transmitted signals. This degradation may be from signal loss directly, such as smearing of the signal through the medium, loss of signal strength, etc. Another source of degradation is noise. Noise may be wideband, narrowband, Gaussian, colored, etc. Another source of signal degradation may be from other signals. Often this type of degradation or interference is called crosstalk (also cross-talk).

Crosstalk refers to the case signals become superimposed upon each other. The signals may be superimposed by electromagnetic (inductive) and/or electrostatic (capacitive) coupling in wireline networks. Signals from adjacent transmitters may also be superimposed over the air in wireless networks. Also, signals from adjacent frequency bands or wavelengths may be superimposed in cable and optical networks respectively. Crosstalk may come from a variety of physical sources and/or properties, such as bundles of twisted pairs that may be capacitively coupled. In bundles of wires, crosstalk may be reduced by the use of shielded cables or increasing the distance between the signal carrying lines. In wireless and optical networks, crosstalk may be reduced by increasing the transmitter and wavelength spacing respectively. Shielded cables are more expensive than twisted pair and so this results in increased cost. Increasing the distance between conductors would result in an increased cable bundle size that may present a space problem. Similarly, increasing the distance between transmitters or wavelengths in wireless and optical networks reduces the system's capacity. Thus, signal crosstalk is a problem because it degrades communications. For this reason, the accurate characterization of the interfering sources may be useful in the analysis, diagnosis and ultimately mitigation of the interference.

SUMMARY OF THE INVENTION

A method and apparatus for identification of interference sources are disclosed. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
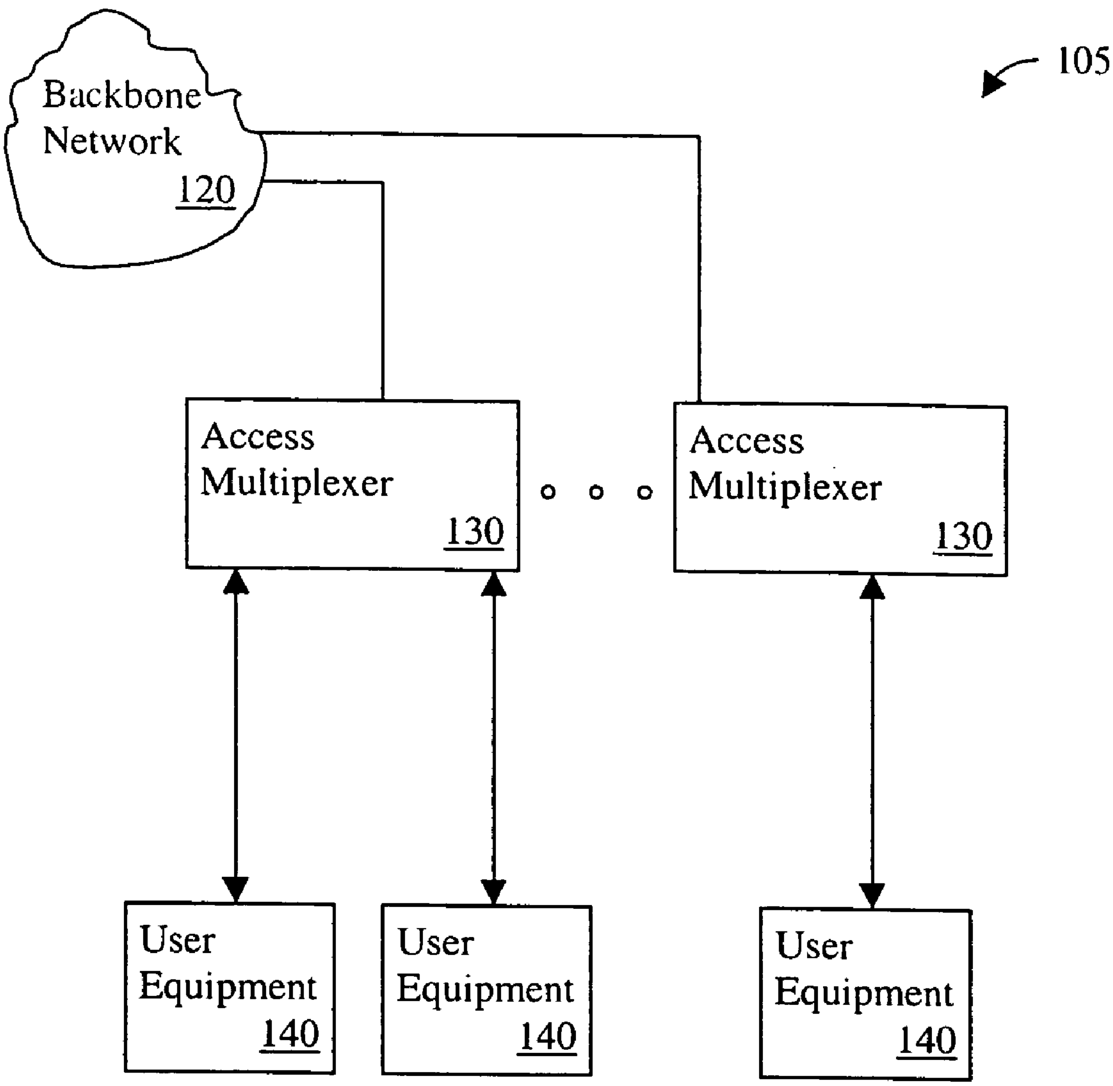
FIG. 1 illustrates an exemplary communication system in which the present invention may be practiced.

A method and apparatus for identifying interference sources are described. For purposes of discussing and illustrating the invention, several examples will be given in the context of a wireline communication system, such as DSL. However, one skilled in the art will recognize and appreciate that interference, for example, crosstalk is a problem in wired and wireless communications and that the techniques disclosed are applicable in these areas as well.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Overview of General Communication Network

The present invention is applicable to a variety of communication systems, for example: wireline, wireless, cable, and optical. FIG. 1 illustrates an exemplary communication system 105 that may benefit from the present invention. The backbone network 120 is generally accessed by a user through a multitude of access multiplexers 130 such as: base stations, DSLAMs (DSL Access Mulitplexers), or switchboards. The access multiplexers 130 communicate with the network users. The user equipment 140 exchanges user information, such as user data and management data, with the access multiplexer 130 in a downstream and upstream fashion. The upstream data transmission is initiated at the user equipment 140 such that the user data is transmitted from the user equipment 140 to the access multiplexer 130. Conversely, the downstream data is transmitted from the access multiplexer 130 to the user equipment 140. User equipment 140 may consist of various types of receivers that contain modems such as: cable modems, DSL modems, and wireless modems. In this network access system the current invention may be practiced to identify sources of interference in the access channels.

For illustration purposes and in order not to obscure the present invention, an example of a communication system that may implement the present invention, in one embodiment, is given in the area of DSL communication systems. As such, the following discussion, including FIG. 2, is useful to provide a general overview of the present invention and how the invention interacts with the architecture of the DSL system.

Overview of DSL Example

DSL is to be understood to refer to a variety of Digital Subscriber Line (DSL) standards that, even now, are evolving. Each DSL standard will be referred to as a DSL service type. At the present time, DSL service types include, but are not limited to, ADSL, SDSL, HDSL, and VDSL (Asymmetrical, Symmetrical, High speed, and Very high speed DSL respectively).

Figure 2:
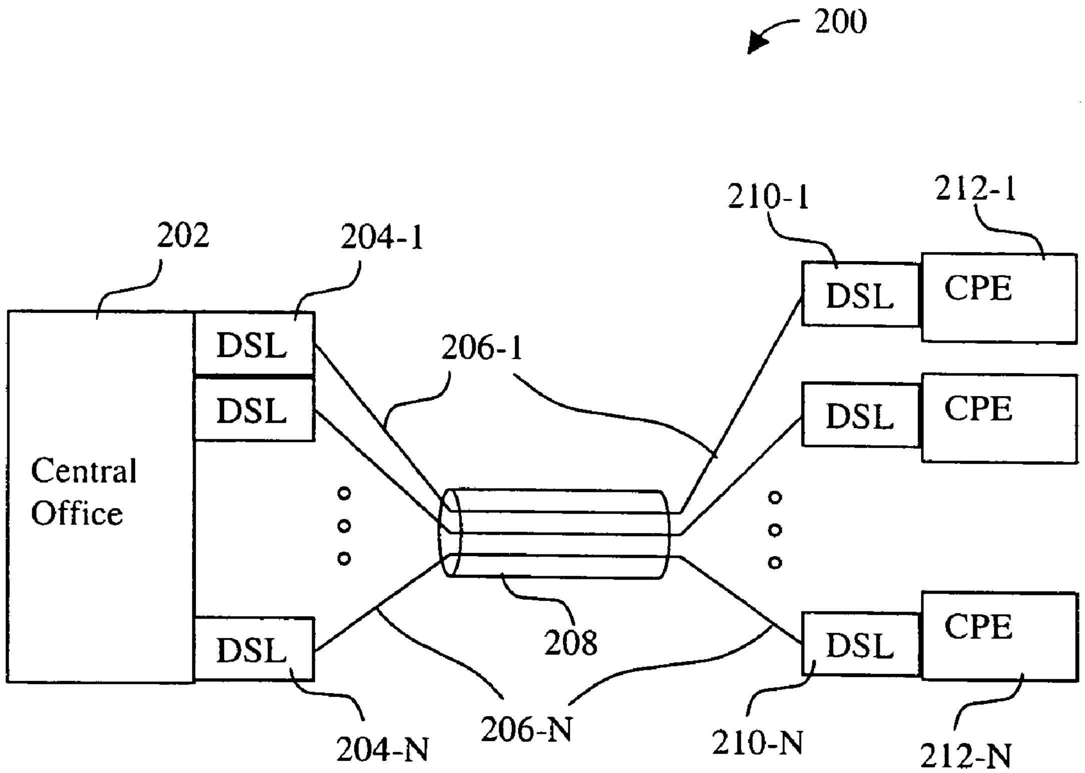
FIG. 2 is a diagram of a DSL communication system in which the present invention may be practiced.

FIG. 2 illustrates a communication system 200, in which the present invention may be practiced. A central office 202 has a series of DSL modems 204-1 through 204-N connected via twisted pairs 206-1 through 206-N as a bundle 208 connected to customers DSL 210-1 through 210-N which is connected respectively to customer's premise equipment (CPE) 212-1 through 212-N, such as computers. One skilled in the art recognizes that twisted pair bundle 208 may experience crosstalk between the twisted pairs 206-1 through 206-N and depending upon the services carried by pairs, data rates, and other factors, such as proximity of the pairs to each other, etc., there may be varying and different amounts of crosstalk on pairs.

Figure 3:
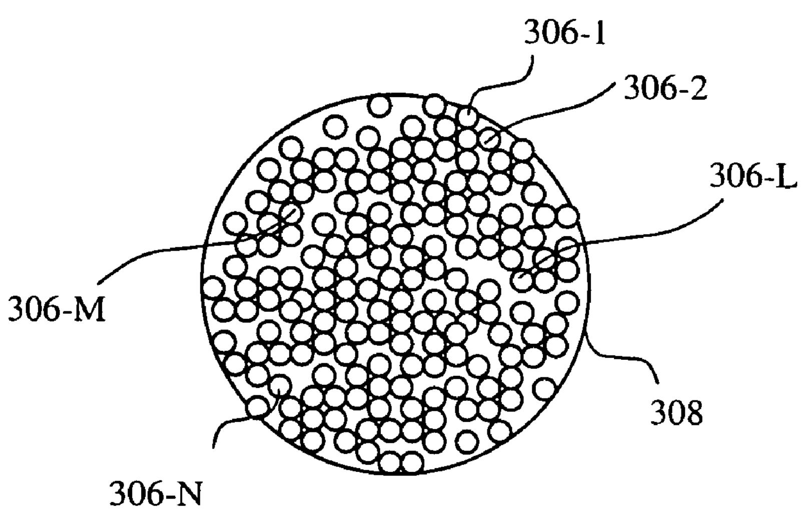
FIG. 3 illustrates a bundle of twisted pairs.

For example, FIG. 3 illustrates a bundle (also called a binder) 308, having twisted pairs 306-1 through 306-N. Pair 306-1 may be expected to experience more crosstalk from a pair 306-2 closer to it than more distant 306-L. Likewise, pair 306-2 located on the perimeter of the bundle 308 may experience different crosstalk than a pair 306-M more toward the center of the bundle 308. Additionally, if pair 306-1 was the only DSL service pair and now pair 306-M is placed into DSL service, there may be new crosstalk due to this activation. Also the type of DSL service (i.e. SDSL, etc.) may have an effect on crosstalk. In general, each DSL service type occupies a band limited frequency region. If pairs in proximity to each other are conveying information in different frequency bands, then there may be less crosstalk than if pairs are conveying information in the same frequency band. For purposes of discussion, co-channel is used to describe the physical coupling between two interfering pairs. This coupling may be represented by a linear dynamic system that will also be called a co-channel.

Figure 4:
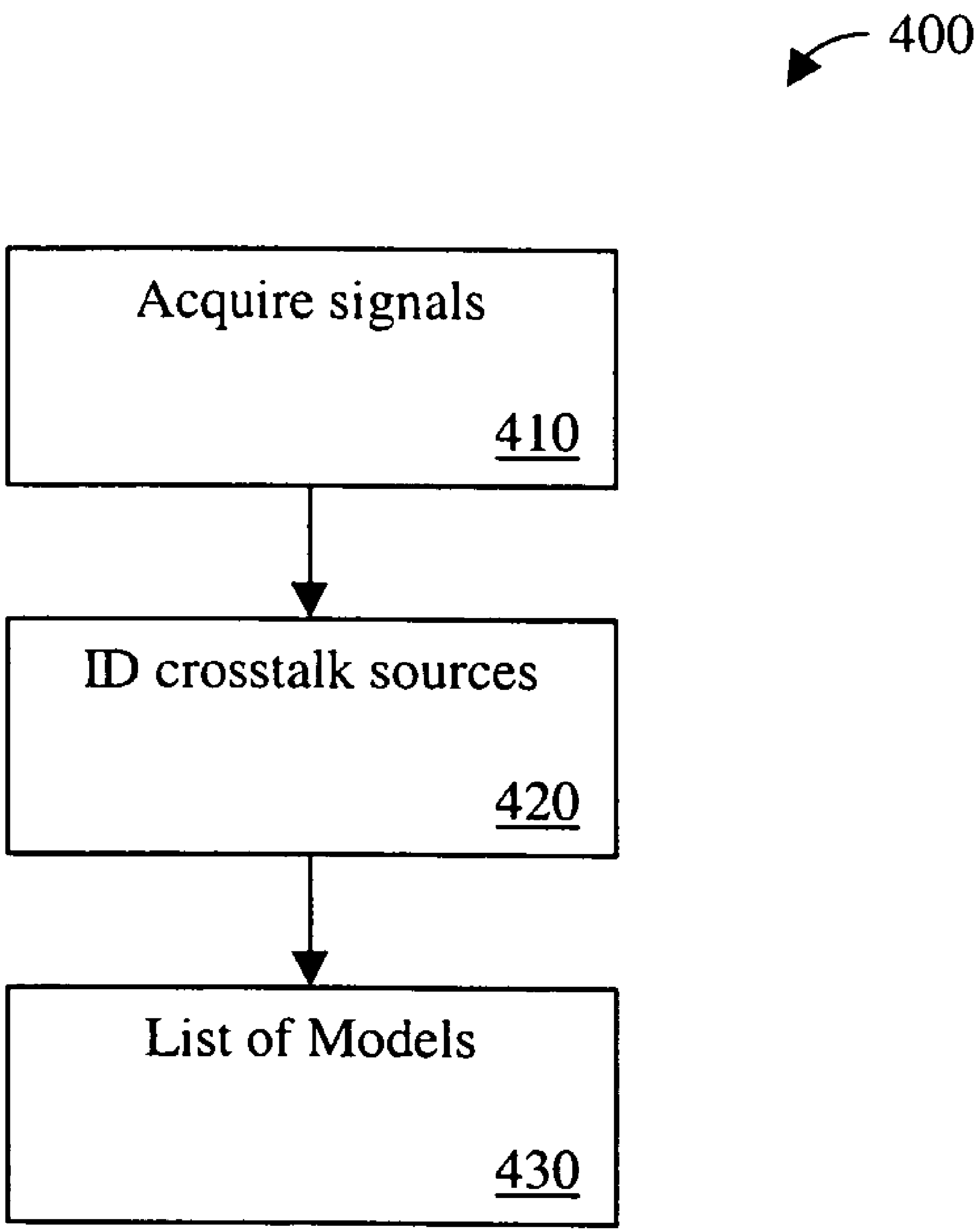
FIG. 4 illustrates a flowchart overview in which the present invention may be practiced

FIG. 4 illustrates a flowchart overview in which the present invention may be practiced. A crosstalk identification device 400, initially acquires signals at 410 that will be analyzed. At 420 an identification of the crosstalk sources is made and a list of models 430 is obtained. At this point, the information may either be stored for later analysis or passed onto, for example, another processing step. For example, if the purpose of the identification procedure is to enable a crosstalk compensation device, then the information may be passed to a compensation design block. It is to be understood that depending upon shifts, drifts, changes in the communication channel, changes in the communications deployed, changes in communications setups, etc., that for optimum compensation the steps as detailed above for FIG. 4 may be repeated at some interval.

In order to illustrate the present invention, as mentioned above, the use in an DSL system will be described and discussed, however as also mentioned above, one is to understand that one of ordinary skill in the art will recognize that the techniques presented are not limited to DSL and may be used in all manner of communication both wired and wireless.

Description of Received Signal

Figure 5:
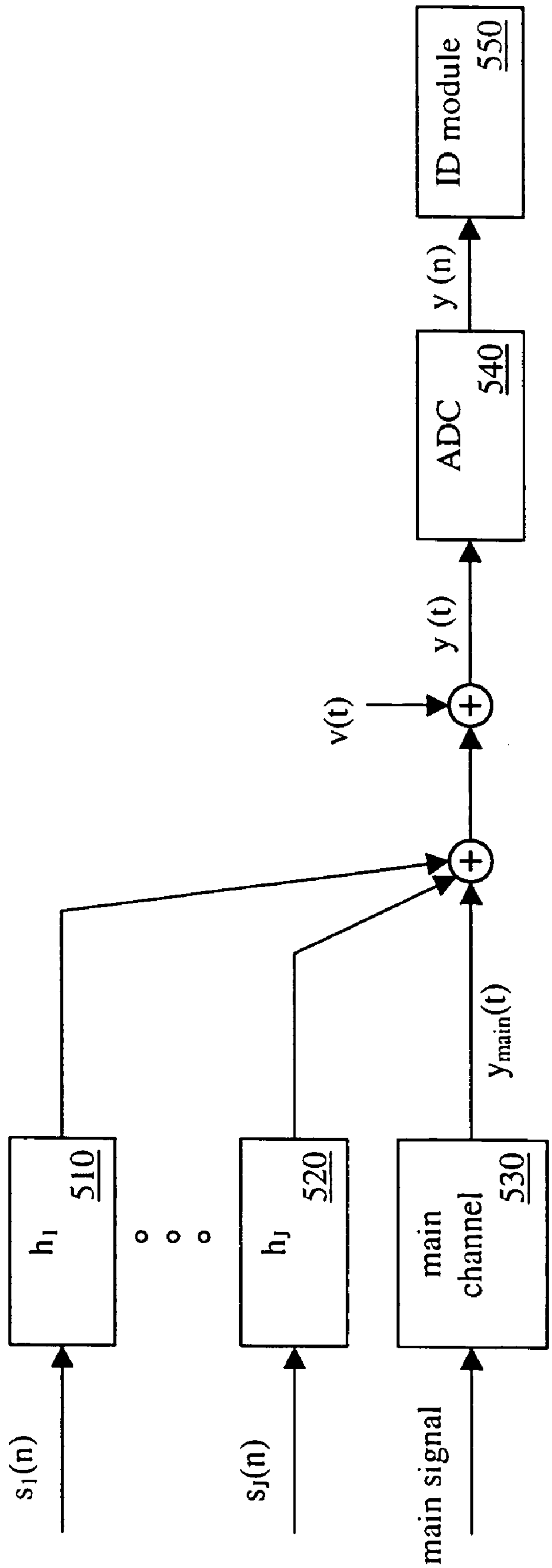
FIG. 5 illustrates a communication channel model in which the present invention may be practiced.

In order to fully describe the present invention techniques, details relating to the signal received at the input of the modem will be described. While one skilled in the art will consider this a review, it affords the reader use of a consistent terminology and symbol usage for denoting aspects of the invention. The structure of the received signal is depicted in FIG. 5 where it is denoted by y(t). In one embodiment of the invention the received signal y(t) is sampled by an analog-to-digital converter (ADC) block 540 producing y(n). We use the notation y(t) to represent continuous time signals and y(n) to represent discrete time signals. The discrete time signal y(n) is then passed on to the ID module for further processing.

To facilitate the description of the invention, we will focus our explanation on a specific type of disturbers. In particular, we will concentrate on pulse amplitude modulation (PAM) crosstalk disturbers. However, it will be clear to one skilled in the art that the same procedure can be applied to other crosstalk sources and is not limited to any particular modulation technique. Crosstalk sources such as quadrature amplitude modulation (QAM), carrierless amplitude and phase modulation (CAP), etc, or any mixture of modulations may also be analyzed through the same procedure.

The received signal y(t) generally consists of a large number of components contributed from various sources of signal and interference. FIG. 5 describes those components in more detail. Generally, the received continuous time signal y(t) is $$y(t)=y_{main}(t)+y_{dist}(t)y_{dist}(t)=y_{pam}(t)+v(t) \tag{1}$$

where the signal $y_{dist}(t)$ contains the contribution of all the possible disturbers. We will refer to this signal as the aggregated disturbance signal. The aggregated disturbance signal can be decomposed into two terms: $Y_{pam}(t)$ contains the contribution of the PAM signals only, and v(t) represents the unmodeled noise.

Of particular interest is the signal $y_{pam}(t)$ which contains the disturber signals which we wish to characterize. Assume that there are J PAM disturbers that are explicitly modeled in the received signal. Then $$y_{pam}(t)=\sum_{j=1}^{j} y_j(t) \tag{2}$$

and each individual PAM signal is $$y_j(t) = \sum_{k=-\infty}^{\infty} s_j(k)h_j(t-kT_j) \tag{3}$$

where $s_j(k)$ represents the transmitted PAM sequence of the j-th disturber through an overall co-channel impulse response $h_j(t)$ and with symbol period $T_j$. Finally, the received signal sampled at a sampling rate $T_s$ is $$y_{pam}(n) = y_{pam}(t)|_{t=nT_s} = \sum_j y_j(n) \tag{4}$$

where $$y_j(n) = \sum_k s_j(k)h_j(nT_s - kT_j) \tag{5}$$

The noise signal has little structure and is the simplest of the three components to describe. The sampled noise signal $$v(n)=v(t)|_{t=nT_s} \tag{6}$$

may be modeled as additive Gaussian noise the color of which is characterized by the power spectral density of the signal v(t). In other cases, the noise term can model other interfering signals that will not be actively characterized like impulsive noise, AM radio interference etc.

Last, but not least, the main signal $y_{main}(n)$ may be present in the received signal. If the service type on the main line is the same as the service type on the disturber lines, then the main signal will have an identical description with the one given above for each disturber signal. If the service type on the main line is for example an ADSL service, then the main signal will employ DMT modulation and its description will be different (for details on the description of a DMT main signal see co-pending patent application Ser. No. 09/710,579 titled "Method and Apparatus for Mitigation of Disturbers in Communication systems" assigned to the assignee herein and filed on even date herewith. In several cases the receiving modem may be able to force the modem transmitting on the same line to silence through the use of an appropriate command. In that situation there is no main signal component in the received signal and $y_{main}(n)=0$. In any case, the main signal does not play an important role in the disturber characterization process and its exact description is not required in the current context to understand the present invention. In fact, the main signal is removed from the received signal before the identification proceeds as described next.

Signal Characterization Procedure

Now that the received signal has been described, an overview of the steps that occur during identification time will be discussed. There are four main steps:

1. detection of service types present,
2. baud rate estimation,
3. setup of co-channel identification, and
4. initial co-channel identification.

An overview of each process will be given, with details to follow.

Detection of service types present is a technique that determines the frequency regions with significant disturber energy. Since there are a large number of possible baud rates that may impair the main line, it is not realistically feasible at this time to try each single rate in order to determine if a service type is present or not. Therefore, an initial coarse selection of the possible frequency regions containing disturber energy accelerates the entire identification process. The outcome of this process is a collection of data rates which contribute disturber energy to the received signal.

Each data rate determined from the above process represents a possible disturber service type present in the transmission. However, several disturbers may correspond to the same service type and/or data rate. Once the possible disturber data rates and/or service types are determined, the accurate baud rate and co-channel estimation steps are repeated for each identified service type.

Note that due to oscillator differences, the actual timing signal used by the disturber generation may not be synchronized with the main channel timing signal. For example, crystal oscillators are known to differ from the nominal frequency by as much as 100 parts per million. However, in order to obtain accurate co-channel estimation, we estimate the difference between the actual PAM baud rate and the nominal one. This is done during the baud rate estimation step.

Figure 6:
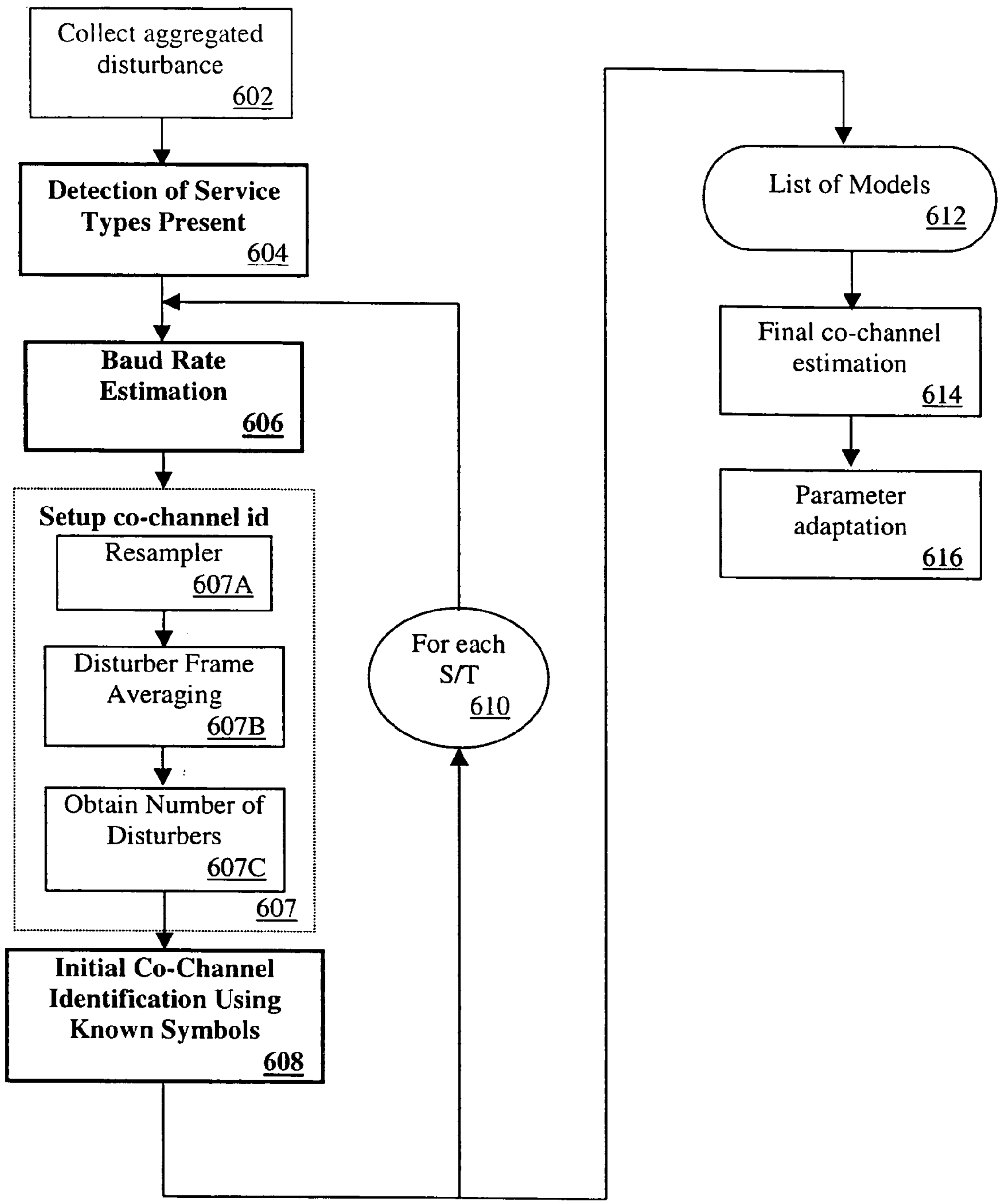
FIG. 6 is a flow diagram of one embodiment of an identification process.

FIG. 6 is a flow diagram of the overall identification process. The first step in the process for the present invention in one embodiment in a DSL modem would be the collection of the aggregate disturbance signal 602. Note that with specific reference to an ADSL modem, the identification operations may be performed during Medley, after time equalization (TEQ) and frequency equalization (FEQ) training. Thus, in order to obtain the aggregate disturbance signal, one would need to remove the main signal. For an example of particular details of the main signal removal procedure see co-pending patent application Ser. No. 09/710,579 titled "Method and Apparatus for Mitigation of Disturbers in Communication systems" assigned to the assignee herein and filed on even date herewith. It may be possible that in other uses of the invention, the signal from the main channel is not present during identification time. This may happen for example if identification is performed before the main channel transmitter is powered on or is otherwise allowed to transmit, or is instructed to not transmit. Then, the received signal is simply the aggregated disturbance signal. It is clear that in this situation the main signal removal step is not required.

The next step during identification is the detection of the service types present 604 in the signal. Next is a sequence of three major steps that may be related for each service type present 610. The first step in the three major steps is that of a baud rate estimation 606, followed by the second step, a setup of the co-channel identification procedure 607, and the third step is an initial co-channel identification 608 using symbols embedded in the signal that are known a priori. The result after step 608 is an initial model of the co-channel. If more service types remain unprocessed, then for each service type present 610 the steps 606, 607, and 608 are repeated. When all service types present have been processed the result is a list of models 612. This list of models 612 may be used to create, construct, modify, and/or design a compensation system. Alternatively, the list of models may be used to analyze the crosstalk disturbance of a particular communication channel.

The list of models 612 can be further refined during a final co-channel estimation 614. Finally, when dealing with long observation periods, time varying co-channels, etc., a parameter adaptation procedure 616 may be advantageous to implement.

Next, we will describe parts of the identification process in more detail.

Service Type Identification and Baud Rate Estimation

Existing baud rate estimation techniques for single disturbers use nonlinearities to obtain a periodic signal with a period that is the desired baud rate, and then use a Phase Lock Loop (PLL) to track small differences. However these techniques require good SNR levels in order to detect small phase errors, and they cannot be applied when several signals with similar baud rates and energy levels are present at the same time. To circumvent some of these problems, the present invention exploits the cyclostationary properties of the disturbers and performs a search in the frequency domain. The resulting technique is accurate and may be implemented in an efficient form.

To start the description of the procedure, let us rewrite Equation (1) that describes the aggregated disturbance as follows:

$$y_{dist}(n) = \sum_j \sum_l \sum_k s_{jl}(k) h_{jl}(nT_s - kT_{jl}) + v(n) \quad (7)$$

In this equation, the index j goes through the set of service types, l indexes among all the disturbers from the j-th type, $s_{jl}(k)$ is the sequence of symbols sent by the l-th disturber of type j. Similarly, $T_{jl}$ is the baud rate, and $h_{jk}(.)$ is the co-channel for the l-th disturber of type j.

Note that the actual baud rate $T_{jl}$ may have an offset with respect to the j-th nominal frequency. This offset is determined by the characteristics of the local oscillator in the disturber transmitter. The local oscillator at the disturber transmitter determines the actual baud rate of a particular disturber, as well as its timing signal. In general, the local oscillator has a constant unknown offset with respect to its nominal frequency that can cause maximum frequency errors of 100 parts-per-million. The maximum allowable frequency offset for a particular disturber type is specified in the corresponding service type standard. If the observation time is short enough, it is possible to neglect instantaneous phase errors of the timing signal due to frequency drift with time and other random effects. The use of a short segment is advantageous from an implementation perspective, and under these conditions we may assume that the only source of phase error is a constant frequency offset with respect to the nominal frequency. The issue of timing signal tracking for longer periods is considered in a later section below.

Notice that the received disturber signal is a mixture of transmitted signals of different baud rates. In several applications, the nominal frequencies of the disturbers may be unknown. Even when several disturbers of the same nominal frequency are present, the actual individual baud rates may be different due to the differences among the local oscillators in the disturber transmitters.

It is also important to observe that the co-channels $h_i(.)$ may have comparable energy levels. Therefore, some of the individual disturbers in the received mixture may have similar levels of total energy. This implies that in general, the signal to noise ratio (SNR) of any given disturber computed as the ratio between total signal energy for the said disturber and total noise and interference energy may be very poor and traditional baud rate estimation techniques may fail in this situation. An alternative approach is to perform a precise search in the frequency domain using a Fast Fourier Transform (FFT).

To assist the reader in understanding, we will first analyze the case of baud rate estimation when a single disturber is present. Let T be its corresponding baud rate. The technique described in this section is based on the cyclostationary properties of the signal in Equation (7). For that, we estimate the correlation of the signal $y_{pam}(n)$. Let $r(n, \tau)$ be the time varying autocorrelation of $y_{pam}(n)$ as follows $$r(n, \tau) = E[y_{pam}(n) y_{pam}(n+\tau)] \quad (8)$$

It is possible to demonstrate that r (n, 0) is a periodic signal with period T. Then, the baud rate T can be recovered as the period of r(n, 0). Let us denote by r(n) an instantaneous estimate of r(n, 0), i.e., $$r(n) = (y_{dist}(n))^2 \quad (9)$$

Then it can be shown that the Fourier transform of r(n) converges to the Fourier transform of r(n, 0) as n goes to infinity. Hence, r(n) can be used to estimate the period T.

In the case where multiple disturbers are present, if the disturbers are independent one from the others, and the co-channels are different, r(n) will contain the sum of processes with periodic components. Therefore a careful search for the periodic components of r(n) will yield the desired answer. One possible technique to perform this search is to use a fast Fourier transform (FFT). In order to reduce the complexity of the overall technique without reducing the accuracy of the estimation, we will select candidate frequency regions to perform the searches. It is possible to improve the resolution of an FFT along a certain frequency region by "zooming in" the desired frequency region. For example, if the desired frequency region is centered at $f_0$ and has a bandwidth W then it is possible to modulate r(n) by the nominal frequency $f_0$. and the resulting signal is $r_m(n)$ $$r_m(n) = r(n) e^{j2\pi f_0 n} \quad (10)$$

After removing the high frequency components from $r_m(n)$, the resulting signal is a baseband signal $$r_b(n) = r_m(n) * h_{LP}(n) \quad (11)$$

where $h_{LP}(n)$ is a low pass filter with cutoff frequency $f_0/2$.

It is possible to reduce the bandwidth of $r_b(n)$ to be equal to W by using a cascade of lowpass and decimator filters. For example, if we let L be the decimating factor and $h_{LP1}$ the lowpass filter corresponding to the first decimating filter then, the output after the first decimation is as follows $$r_{bs1}(nL) = \sum_l r_b(l) h_{LP1}(k-l)\Big|_{k=nL} = \sum_l r_b(l) h_{LP1}(nL-l) \quad (12)$$

Notice that the bandwidth of $r_{bs1}(n)$ has been reduced by a factor L. By applying a cascade of low pass and decimator filters, it is possible to reduce the bandwidth of the signal $r_b(n)$ to W, the bandwidth of the desired frequency region. Then a simple FFT analysis allows us to obtain all the harmonic components of the signal in the frequency range [−W, +WM]. It is clear that this frequency range corresponds to the frequency range $[f_0-W, f_0+W]$.

Figure 9:
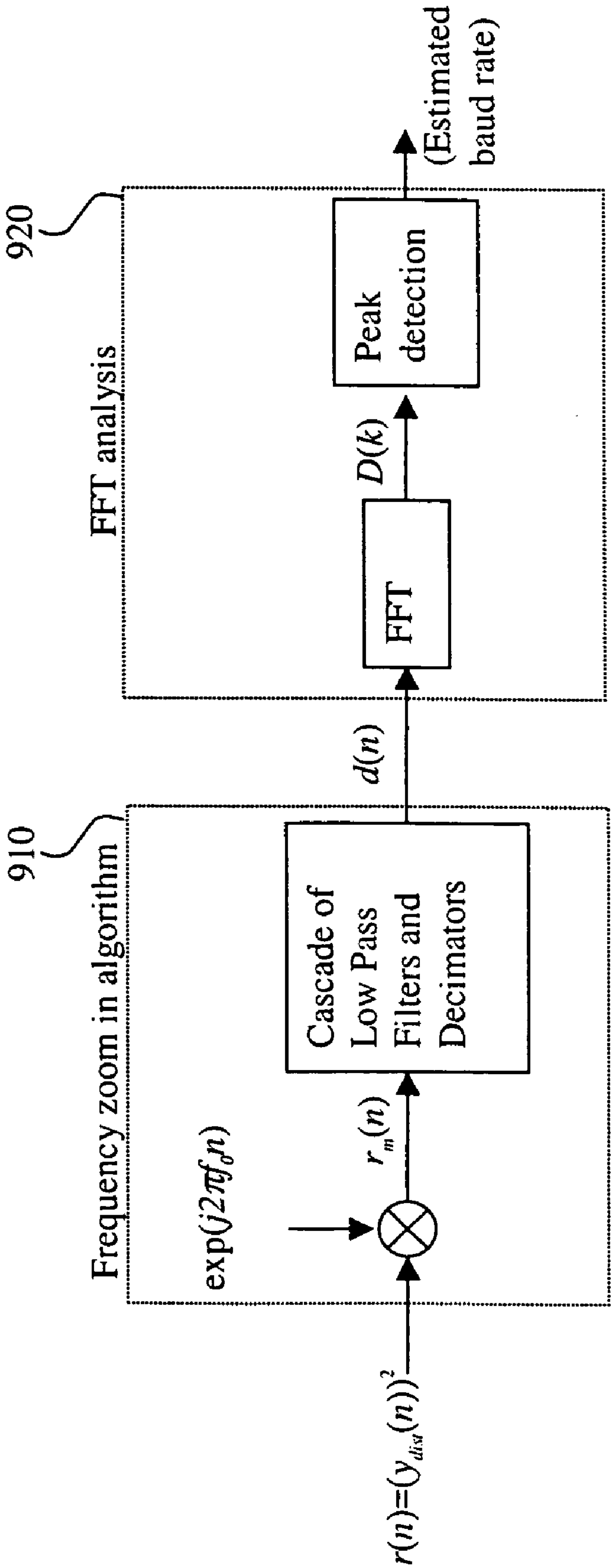
FIG. 9 shows a block diagram of a frequency zoom in algorithm followed by an FFT analysis.

FIG. 9 shows a block diagram of the frequency zoom in algorithm 910 followed by a FFT analysis 920.

From the discussion above, the election of the frequency search regions can be seen to be an area of practical concern. The nominal frequency $f_0$ is a characteristic of the disturber type and it is specified by the service type standard (SDSL, ISDN, etc.) that defines each particular disturber type. On the other hand, the bandwidth W is determined by the accuracy of the local oscillator, also specified in the applicable standard. If we let N be the number of possible disturber types present in the mixture of Equation (1), and assume that for each disturber type the standard specifies fi possible nominal frequencies, then the set F defined as $$F=\{f_{0,j}^{\,i},\ j=1,\ \ldots\ n_i,\ i=1\ \ldots\ N\}$$

is the set of all possible nominal frequencies. When this set is a reduced set of frequencies, then it is possible to specify a reduced set of intervals $|f_{0,j}^{\,i}-W_i,\ f_{0,j}^{\,i}+W_i|$.

Figure 10:
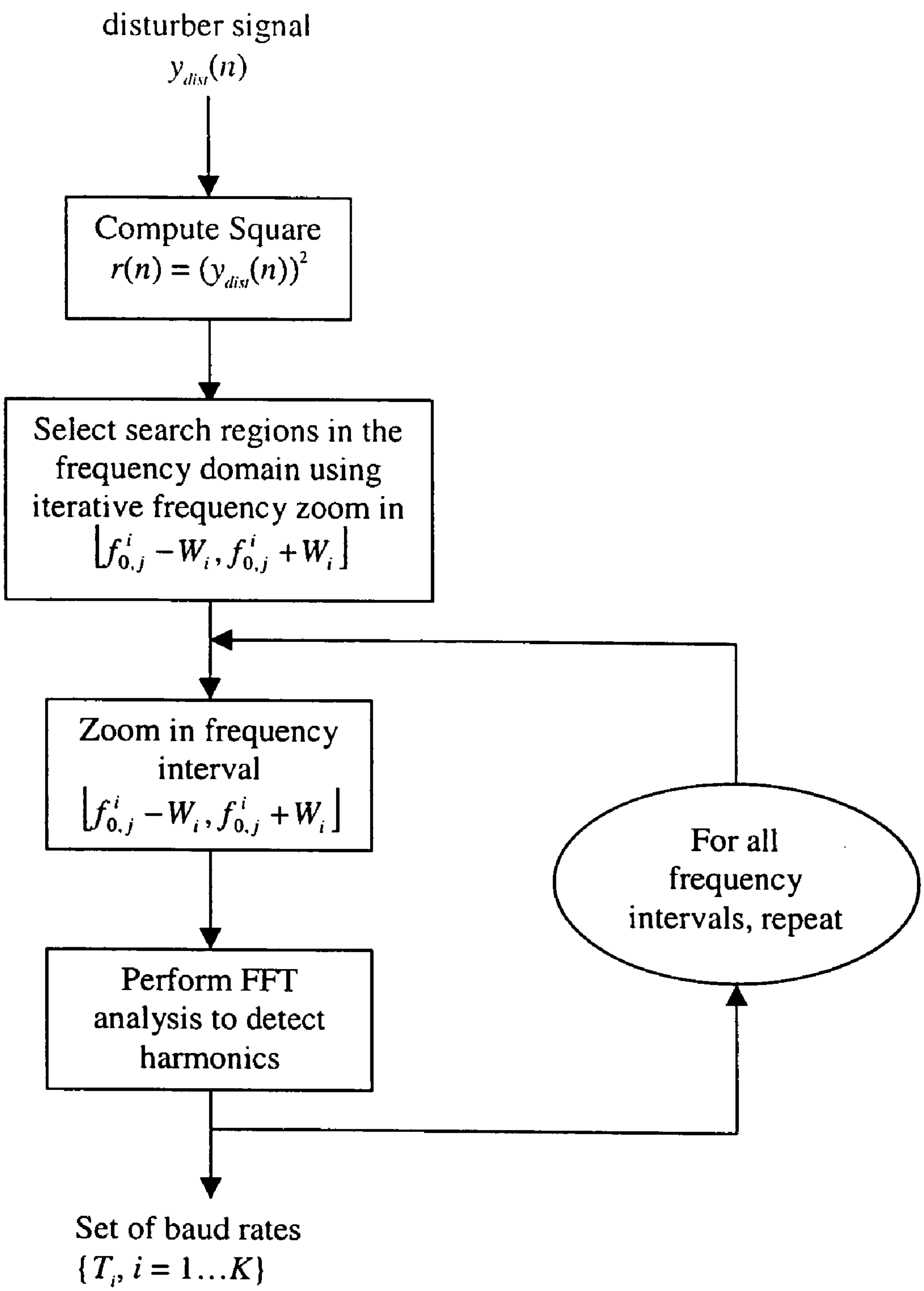
FIG. 10 illustrates one embodiment of blind baud rate estimation.

However, in certain applications of the present invention, the set F may be very large or even unknown. In these cases, an a priori specification of the search regions is unfeasible. Nonetheless, it is always possible to perform a coarse initial search to determine the main frequency regions (as illustrated at step 604 in FIG. 6) that contain significant energy using the frequency zoom in algorithm described above. Another alternative is to divide the total bandwidth of the signal r(t) in N regions, each one with bandwidth $W_t/N$ and then perform a frequency zoom in and an FFT analysis in each region. Those frequency regions that exhibit some periodic energy may be further refined. This procedure may be iterated several times until the desired accuracy in the frequency estimation is obtained. This approach is denoted as blind baud rate estimation and is further illustrated in FIG. 10.

In order to characterize a particular disturber it is important not only to determine its baud rate but also its alphabet, frame length, etc. This particular characterization is known as service type identification. Once the service type of each disturber has been determined, it is possible to use the known features of each standard to perform co-channel identification. For example, most DSL standards specify a sequence of synchronization symbols that are sent periodically by the central office. The time elapsed between two consecutive synchronization sequences is known as a frame of data. The frame length and the synchronization sequence used by each particular standard may be known a priori. As it will be explained later, the sequence of known symbols is used as a training sequence during the co-channel identification step. It is clear that any sequence of symbols known a priori can be used in this procedure. In particular we will describe the procedure using the synchronization symbols embedded in the disturber signal.

In the discussion of the present invention, so far, we have described use of the coarse frequency estimation step as a means to determine the service type of the disturbers that are present. It will be clear to one skilled in the art that an alternative approach is to use known symbols to perform service type identification. Please note that either of these approaches, and others, may complement or supplement one another. An advantage of doing service type identification by using baud rate estimation is that it requires using only a small segment of data, thereby eliminating distortion of the data introduced by phase errors of the timing signals.

Initial Co-Channel Identification

Referring to FIG. 6, we will describe the setup of the co-channel identification 607 procedure. To illustrate the procedure, let us focus again on Equation (7). The sequence $s_{jl}(k)$ is divided in two subsequences:

$$s_{jl}(k)=s_j^{\,s}(k)+s_{jl}^{\,r}(k) \qquad (13)$$

Figure 7:
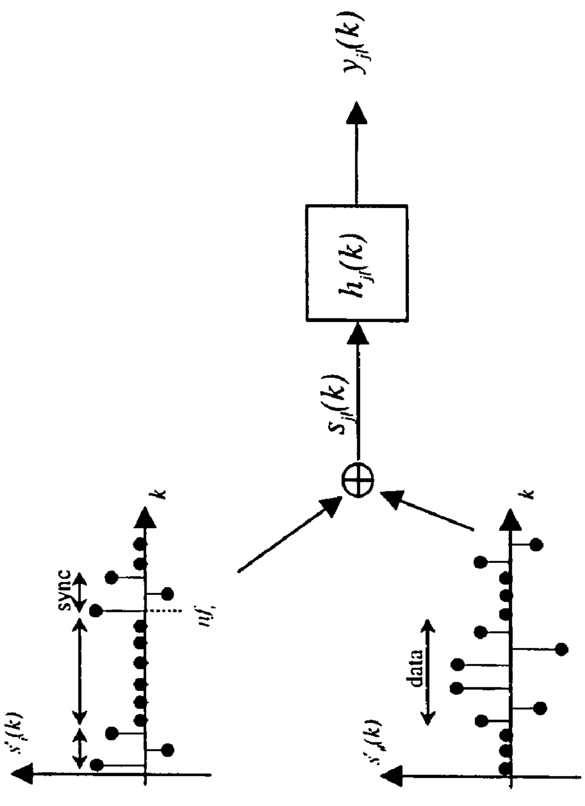
FIG. 7 illustrates the generation of the 1-th disturber from the j-th service type showing the synchronization sequence and the random data.

The first subsequence $s^r_{jl}(k)$ corresponds to the random data: the second subsequence, $s^s_j(k)$ corresponds to the known symbols for service type j. Both sequences are orthogonal, as shown in FIG. 7, which illustrates the generation of the l-th disturber from the j-th service type. In this example, the synchronization symbols are known. FIG. 7 shows the synchronization sequence and the random data. The sequence of known symbols is a periodic sequence and its period is the frame length corresponding to the particular service type.

To illustrate the use of known symbols in co-channel identification, let us assume that the disturbance signal is re-sampled at a fraction $1/P_j$ of the baud rate so that $$y_{dist}(n)=\sum_j\sum_l\sum_k s_{jl}(k)h_{jl}((n-kP_j)T_j)+v(n) \qquad (14)$$

Figure 8:
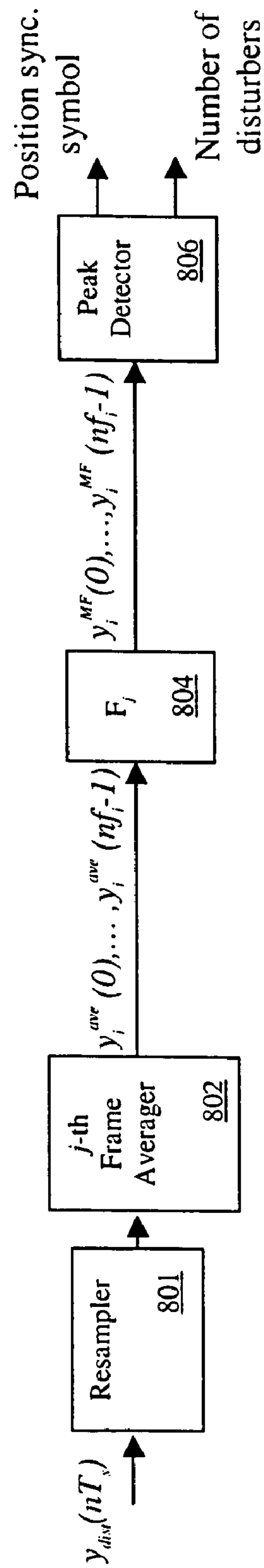
FIG. 8 illustrates a service type identifier composed of a resampler, a frame averager, a matched filter, and a peak detector.

For each service type, we may implement the system shown in FIG. 8 that is composed of a resampler 801, a frame averager 802, a match filter 804, and a peak detector. Let $nf_j$ be the frame length corresponding to the j-th service. If we assume that $N.nf_j$ samples have already been collected. Then, the output of the frame averager is a sequence of length $nf_j$ that is obtained as follows:

$$y_j^{ave}(n)=\frac{1}{N}\sum_{l=0}^{N-1}y_{dist}(n+l\cdot nf_j)\qquad n=0,\ \ldots\ ,nf_j \qquad (15)$$

$$n=0,\ \ldots\ nf_j \qquad (15)$$

In order to determine the presence or absence of the known sequence of symbols, the design of a matched filter uses the sequence of known symbols, $s^s_j(0)\ \ldots\ s^s_j(M_j-1)$, convolved with the pulse-shaping filter of the j-th PAM disturber $p_j(n)$ as an approximation to the actual co-channel.

$$F_j(n)=\{s_j^s(l)*p_j(l)\}_{n=-l}=\sum_k s_j^s(k)p_j((-n-kP_j)T_j) \qquad (16)$$

Then, $$\begin{aligned} y_j^{MF}(n)&=\sum_l y_j(l-n)F(l) \qquad (17)\\ &=\sum_l\sum_k y_j(l-n)s_j^s(k)p_j((-l-kP_j)T_j)\end{aligned}$$

When j-th type is present in the mixture of disturbers $(y_{dist}(nT_s))$, the output of the j-th matched filter has a peak. Peak detection is done using an appropriately selected threshold. The value of n corresponding to the peak matches to the position of the center of the sequence of known symbols in the averaged frame of data. The peak detection module generates two important outputs. The first one is the position of the synchronization sequence within the frame of data, which is obtained by observing the index n at which a peak is detected. The second output is the number of disturbers of the same type that are present at the same time. This output is obtained by counting the number of peaks detected in the averaged frame.

Notice that as was mentioned before, it is possible to use the system described in FIG. 8 to perform service type identification. Suppose that the service types that are present in $y_{dist}(n)$ are unknown. Then, one can implement a bank of systems such as the one shown in FIG. 8. Each system will be designed according to a possible service type. When a particular service type is present, the output of the matched filter 804 displays a peak that can be detected by the peak detector 806. To decrease the risk of false alarm, a hypothesis test may be run with the outputs of the peak detectors.

Once the co-channel identification setup is completed, the averaged frame described in Equation (15), the total number of disturbers, and the position of the synchronization sequences are passed to the initial co-channel identification step (block 608 in FIG. 6).

To illustrate the identification procedure, we decompose the averaged data ($y_j^{ave}(k)$) into three terms:

$$y_j^{ave}(n)=y_{id_j}(n)+y_{isi_j}(n)+v(n)=y_{id_j}(n)+w_j(n) \tag{18}$$

where $$y_{id_j}(n)=s^s_j(n)*h_j(n)$$

$$y_{id_j}(n)=s_j^s(n)*h_j(n) \tag{19}$$

$$y_{isi_j}(n)=s_j^r(n)*h_j(n)+\sum_m s_m(n)*h_m(n)$$

$$w_j(n)=y_{isi_j}(n)+v(n)$$

$$w_j(n)=y_{isi_j}(n)+v(n)$$

The first term in Equation (18), $y_{id_j}(n)$, corresponds to the contribution of the sequence of known symbols $s_s^j(0)\ldots s^s_j(M_j-1)$ to the j-th disturber. The second term in Equation (18), represents the contribution of the random data of the same type $s^r_j(k)$, as well as the contribution of the disturbers of different types. Finally, the last term in Equation (18) is the noise term. For the purpose of an identification technique, the noise term $w_j(k)$ may considered to be composed of the contribution of the random data and the additive Gaussian noise.

We will use the sequence of known symbols $s^s_j(0)\ldots s^s_j(M_j-1)$ as the input to the system. To decrease the influence of the random disturber symbols, we estimate the position in the frame of data of the starting time for the sequence of known symbols. Let $K_j$ be this position, and $L_j$ be the length of the j-th co-channel. Then, the identification problem is to minimize the following cost function among a selected family of models Π.

$$\hat{h}_j=\operatorname{argmin}_{h\in\Pi}\sum_{k=K_i}^{K_j+M_j+L_j-1}(y_j^{ave}(k)-s_j^s(k)*h(k))^2 \tag{20}$$

The sequence of known symbols is in general very short. For example, in the case of HDSL services, only 7 symbols out of 2351 are used for synchronization purposes. Therefore, one cannot assume to have perfect input excitation from this class of signals. This also implies that the model order of the models in HI cannot be chosen arbitrarily large.

Figure 11:
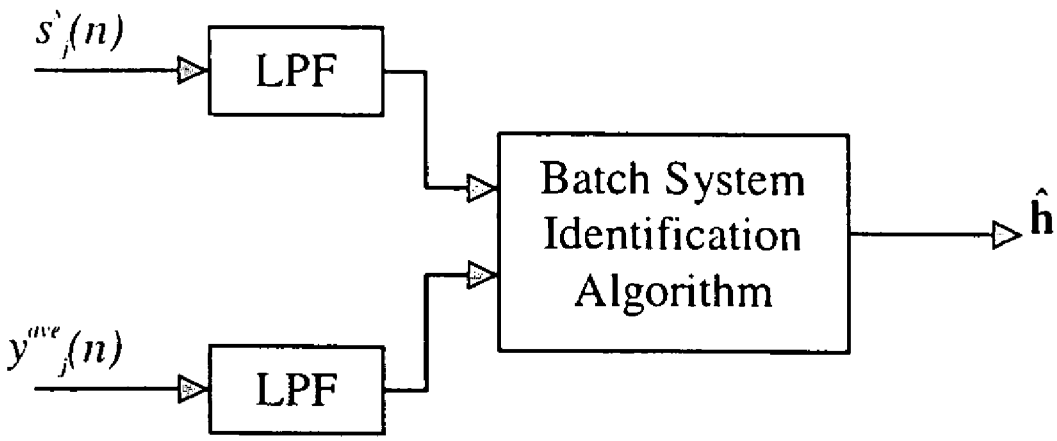
FIG. 11 illustrates identification using a sequence of known symbols.

To reduce the high frequency noise, both inputs and outputs may be filtered using a lowpass as shown in FIG. 11 illustrating identification using a sequence of known symbols. Notice that since both input and output are lowpass filtered, only the noise system is modified. However, if only the output data had been filtered, then the input/output model, or h(k), would also include the lowpass filter, which may have an undesirable effect.

Several disturbers of the same type may be treated jointly when the starting position of their synchronization sequences are close together. In this case, the summation as in $\hat{h}_j$ above is extended as follows $$\{\hat{h}_{j1},\ldots,\hat{h}_{jN}\}=\operatorname{argmin}\left[\sum_{k=K_{j1}}^{K_{j1}+M_{j1}+L_{j1}-1}(y_j^{ave}(k)-s_j^s(k)*h_1(k))^2+\ldots\sum_{k=K_{jN}}^{K_{jN}+M_{jN}+L_{jN}-1}(y_j^{ave}(k)-s_j^s(k)*h_N(k))^2\right] \tag{21}$$

An effective solution for this identification problem is to consider Π as a family of multiple-input-single-output (MISO) models. Then, standard MISO system identification techniques can be applied to this equation ($\{\hat{h}_{j1},\ldots,\hat{h}_{jN}\}$).

So far, we have assumed that in order to synchronize the samples in the averaged frame, we resample the data using the baud rate estimation. However, when more than one disturber of the same type is present this is not possible. Since each disturber transmitter may use different oscillators, the actual baud rates of disturbers of the same type may differ by small amounts. When the synchronization sequences of these disturbers are fired closely together in the data frame, the contribution of the different disturbers cannot be separated, and a MISO system needs to be identified. If the data is not resampled at the exact baud rate of a certain disturber, its pulse will be smeared in the average frames. Since we know the difference between the resampling rate and the actual baud rate, it is possible to account for this effect in the identification process.

For the understanding of the reader, we will present the technique for co-channel identification for the case that a single disturber is present in the mixture of disturbers $y_{dist}(n)$. This result will be extended later to the case of multiple disturbers present in $y_{dist}(n)$. Let T be the baud rate and h(n) the co-channel impulse response corresponding to the single disturber present in $Y_{dist}(n)$. In this case, Equation (7) can be re-written as follows, $$y(nT_s)=\sum_k s(k)h(nT_s-kT)+v(nT_s) \tag{22}$$

Using linear interpolation, we express $h(nT_s-kT)$ as follows:

$$h(nT_s-kT)\approx h((n-k)T)\left(1+n\frac{T_s-T}{T}\right)-h((n-k-1)T)n\frac{T_s-T}{T} \tag{23}$$

In general, using a 21 order interpolation, $h(nT_s-lT)$ has the following expression:

$$h(nT_s-kT)\approx[q_{\Delta T}(n,1)\ \cdots\ q_{\Delta T}(n,2l)]\begin{bmatrix}h((n-k-l)T)\\ \vdots\\ h((n-k)T)\\ \vdots\\ h((n-k+l)T)\end{bmatrix} = q_{\Delta T}(n)h((n-k)T) \tag{24}$$

where $\Delta T=T_s-T$. Notice that in Equation (22), s(k) is a scalar. Moreover, the vector $q_{\Delta T}(n)$ introduced in Equation (24) is independent of k. Thus, $q_{\Delta T}(n)$ can be factored out of the convolution summation in Equation (22) as follows $$y(nT_s)\approx q_{\Delta T}(n)\sum_k s(k)h((n-k)T)+v(nT_s) = q_{\Delta T}(n)\sum_k s(k-n)h(kT)+v(nT_s) \tag{25}$$

For simplicity, we will develop the procedure for h(.) being an finite impulse response (FIR) channel. However, it is straightforward to extend the results from these notes to an infinite impulse response (IIR) model. Let L be the length of the co-channel, and H a 2l+L vector constructed from the impulse response h(kT) as follows $$H=\begin{bmatrix}0_{l\times 1}\\ h(0)\\ \vdots\\ h((L-1)T)\\ 0_{l\times 1}\end{bmatrix} \tag{26}$$

Then, Equation (25) can be rewritten as follows $$y(nT_s)=q_{\Delta T}(n)\cdot\sum_n[0\quad s(k-n)I_l\quad 0]H+v(nT_s) = q_{\Delta T}(n)s(n)H+v(nT_s) \tag{27}$$

where $I_l$ refers to the l-by-l identity matrix. Now suppose that the data frame is nf symbols long. Moreover, suppose that N.nf symbols have been collected. Then, using Equation (27), we compute the averaged frame of data as follows $$\begin{aligned} y^{ave}(nT_s) &= \frac{1}{N}\sum_l y(n+l\cdot nf)+v((n+l\cdot nf)T_s) \\ &= \frac{1}{N}\sum_l q_{\Delta T}(n+l\cdot nf)s(n+l\cdot nf)H+v((n+l\cdot nf)T_s) \\ &= \frac{1}{N}\left[\sum_l q_{\Delta T}(n+l\cdot nf)s(n)\right]H+\frac{1}{N}\sum_l v((n+l\cdot nf)T_s) \end{aligned} \tag{28}$$

The matrix s(n) introduced in Equation (28) contains the known symbols and the random data, i.e., $$s(n)=s^s(n)+s^r(n) \tag{29}$$

In Equation (29), $s^s(n)$ is formed from the sequence of known symbols, and $s^r(n)$ is obtained from the random data. Notice that the sequence $s^s(n)$ is zero before the first known symbol has been sent, and after the last known symbol has been sent. Therefore, the structure of $s^s(n)$ depends on the location of the known sequence within the data frame.

We can separate the two components of s(n) to emphasize the averaging action. Lumping together the noise term and the contribution of the random data in a single term 1E, we rewrite Equation (28) as follows:

$$y^{ave}(nT_s)=\frac{1}{N}\left\{\left[\sum_l q_{\Delta T}(n+l\cdot nf)\right]s^s(n)\right\}H+\varepsilon = Q(n)H+\varepsilon \tag{30}$$

Equation (30) can now be used to obtain an FIR model for h(.).

In order to obtain an IIR model, we need to include the contribution of past output values in Equation (30). Notice that the interpolation process from Equation (24) can be associated to the moving average (MA) portion of an IIR model. Thus, a similar process can be applied to the autoregressive (AR) portion of the IIR model. In general, an m-th order IIR model is expressed as follows $$y(k)-a_1y(k-1)-\ldots-a_my(k-m)=b_0s$$

$$(k)+b_1$$

In Equation (31), s(k) is the input and y(k) is the output of the system. Let A be the matrix formed as in Equation (26) using the coefficients $a_1, \ldots, a_m$. Similarly, we can form the matrix B using the MA coefficients $b_0, \ldots, b_m$. Finally, we denote by $y^{past}(k)$ the vector formed as in Equation (27) using past output values. Then, Equation (30) can be rewritten as follows:

$$\begin{aligned} y^{ave}(nT_s) &= \frac{1}{N}\left\{\left[\sum_l q_{\Delta T}(n+l\cdot nf)\right]s^s(n)\right\}A + \frac{1}{N}\left\{\left[\sum_l q_{\Delta T}(n+l\cdot nf)\right]y^{past}(n)\right\}B+\varepsilon \\ &= Q^s(n)A+Q^{past}(n)B+\varepsilon \end{aligned} \tag{32}$$

In this case, Equation (32) is the one used to perform co-channel identification.

We will now discuss the case of multiple disturbers. If several disturbers fire their synchronization sequences close together, then we use MISO techniques to obtain the estimates of the co-channel.

When multiple disturbers are present, it is straightforward to pose Equation (30) or (32) as a multiple input single output system (MISO)

$$y^{ave}(nT_s) = \sum_j y_j^{ave}(nT_s) = \sum_j Q_j(n)H_j + \varepsilon \quad (33)$$

Notice that in this case the matrix $Q_j(n)$ is different for each disturber because it depends on the location of each synchronization sequence. Co-channel estimates are obtained by using standard MISO identification techniques to Equation (33).

The disturber signal $y_{dist}(n)$ in Equation (1) has been described so far as a mixture of disturber signals plus additive color noise. The purpose of the co-channel identification procedure is to describe the structure of the disturber signal. So far we have described how to describe the mixture of disturbers. The remaining component of the disturber structure is the residual noise term v(t) in Equation (1). To complete the description of the disturber structure, we obtain a description of the random signal v(t). We will consider that v(t) is a zero-mean Gaussian random process. The power spectral density of this signal can be computed using the prediction error obtained from the co-channel models previously identified. An example of such computation is described in U.S. patent application Ser. No. 09/523,065, filed Mar. 10, 2000, entitled Method for Automated System Identification, to C. Galarza, D. Hernandez, and M. Erickson, and assigned to the assignee herein. In some applications, it maybe necessary to compute the noise model when only one disturber co-channel is considered at a time. The noise models obtained with this procedure are important for successive disturber cancellation. For an explanation, see copending patent application Ser. No. 09/710,579 titled "Method and Apparatus for Mitigation of Disturbers in Communication Systems" assigned to the assignee herein and filed on even date herewith.

Also in some applications, it is useful to compute uncertainty bounds for the co-channel models obtained previously. These bounds are a measure of the identification error due to incorrect model structure, finite number of data points, and measurement noise, among other factors. It will be appreciated that modeling errors is well known by a person of ordinary skills in the art and thus further details of this topic will not be described. One embodiment of the computation of the uncertainty bounds has been described in detail in U.S. patent application Ser. No. 09/345,640, filed Jun. 30, 1999, titled "Model Error Bounds for Identification of Stochastic Models for Control Design", assigned to Voyan Technology Corporation of Santa Clara, Calif.

Final Co-Channel Estimation

After some initial estimates for the co-channel impulse responses are obtained via the method described above, further estimation accuracy may be achieved by employing a data-aided identification procedure described next. This is performed in block number 614 in FIG. 6, which is implemented as an approximation of a joint co-channel identification and symbol detection technique.

One alternative approach is to utilize the batch algorithm approach that will be described next. To simplify the explanation, the algorithm is described for one type of disturber modulation only, namely pulse amplitude modulation (PAM). However, the general architecture may be applied to other modulation techniques such as quadrature amplitude modulation (QAM), carrierless amplitude and phase modulation (CAP), etc.

Figure 12:
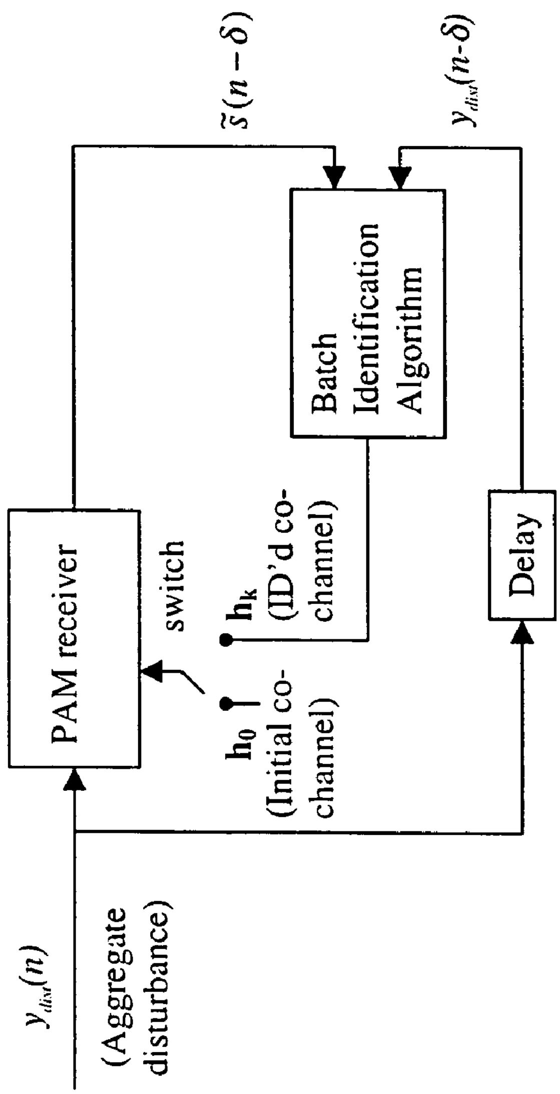
FIG. 12 illustrates one embodiment of a signal flow of a joint co-channel identification and symbol detection architecture based on a batch identification algorithm.

The technique utilizing the identification algorithm is illustrated in FIG. 12, depicting a signal flow of the joint co-channel identification and symbol detection architecture based on a batch identification algorithm. In FIG. 12, $y_{dist}(n)$ is the aggregate disturber, $\tilde{s}(n-\delta)$ is an estimate of the PAM symbols sent at time n-δ, δ is the delay introduced by the PAM receiver, and h is a vector that contains the co-channel model parameters. If L disturbers are present in the aggregate disturbance $y_{dist}(n)$, $\tilde{s}(n-\delta)$ is an L-dimensional vector.

For explanation purposes, assume that an initial estimate of the co-channel impulse response, $h_0$, is provided. Then, using this initial model, we design a PAM receiver to detect the symbols in the aggregate disturbance. When several disturbers are present in the mixture signal $y_{dist}(n)$, then the PAM receiver may be designed as a joint receiver, a successive receiver, or a parallel one. In any case, the PAM receiver can be selected from the well known variety of standard PAM receivers such as linear equalizers followed by a decision device, a decision feedback equalizer, a Viterbi algorithm, etc. The selection of the receiver structure depends on the signal to noise ratio of the received signal, the amount of computational resources available, etc.

Figure 13:
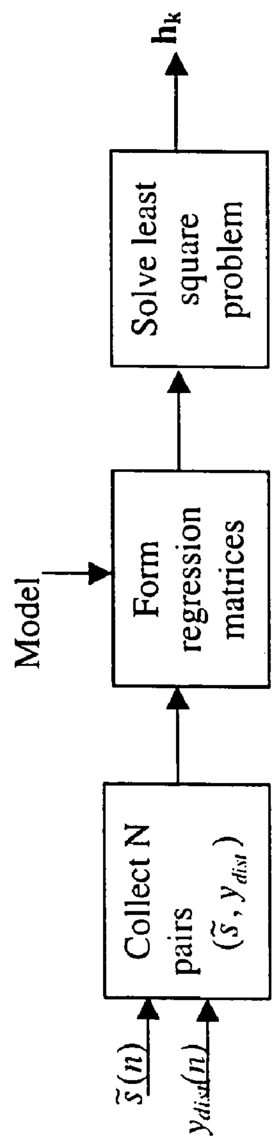
FIG. 13 illustrates one embodiment of a batch identification algorithm.

The output of the PAM receiver is used as the estimated input in a batch identification algorithm. Similarly, the output corresponds to the aggregate disturbance appropriately delayed by δ. The batch identification may be a system identification algorithm as is well known to those in the art. A batch identification algorithm is illustrated in FIG. 13. For purposes of explanation of this embodiment, we assume that a particular model structure has been previously selected. All the possible model structures may be grouped into two large categories: finite impulse response (FR) models and infinite impulse response (IIR) models. The selection of one structure or another may depend on the characteristics of the co-channels to be identified. The first stage of the algorithm is to collect N points of the input and output signals. Then, according to the model structure previously selected, the regression matrices are formed using the recorded inputs and outputs. Finally, the model parameters are obtained by solving a least squares problem. A number of computationally efficient least squares algorithms can be used to solve the problem like square root algorithms, QR factorizations, etc.

If we let $h_1$ be the co-channel impulse response obtained using the batch algorithm, then once the batch identification algorithm is completed, the switch in FIG. 12 is switched from the initial co-channel position to the ID'd co-channel position. The new identified co-channel is used to re-design the PAM receiver and the procedure is reiterated K times until convergence. The co-channel obtained after the k-th iternation is $h_k$.

Note that if several disturbers are present, this strategy may be combined with a successive interference cancellation algorithm to successively obtained models for the co-channels of the different disturbers.

Figure 14:
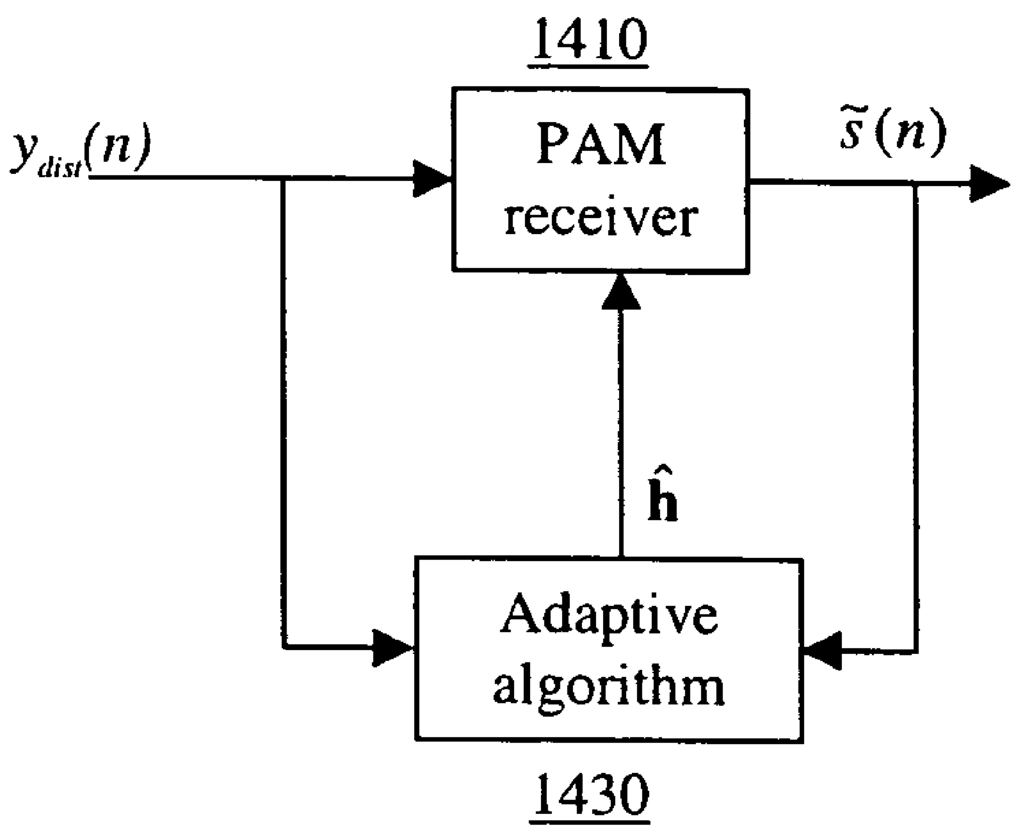
FIG. 14 illustrates one embodiment of a data-aided adaptive algorithm to track time-varying co-channels.

A second alternative for implementing block 614 in FIG. 6 is to use an adaptive channel tracking technique such as the one shown in FIG. 14. In this case, we implement a PAM receiver subsystem, 1410, and a parameter adaptation algorithm 1430. The particular details of these two blocks will be explained in a later section.

Parameter Adaptation

An initial assumption for initial co-channel identification relied upon an observation time short enough to neglect instantaneous phase errors of the timing signal due to frequency drift or other random effects. Thus, the initial identification results relied upon the baud rate being known and fixed. In some applications, it is important to track the changes of the co-channel impulse response during an extended period of time. In those cases, baud rate drift and random effects will affect the performance of the particular application over long time periods.

According to ITU-T recommendation G.810 "Definitions and terminology for synchronization networks", 08/96, the instantaneous phase of a timing signal is represented as $$\Phi(t)=\Phi_0+\delta(t)+\phi(t)$$

where $\Phi_0$ represents the initial phase offset, 8($t$) is related to frequency deviation and drift, and $\phi(t)$ corresponds to the random phase deviation including both clock jitter and wander. For the second term in the above equation, the combined effect of frequency deviation and drift could be on the order of 60 ppm (parts-per-million). Variations caused $\delta(t)$ and $\phi(t)$ pose a serious problem to several applications that require a long time observation period. Thus, the timing issue must be addressed in order for these applications to work effectively. This is accomplished in block 616 of FIG. 6.

What the present invention presents is a data-aided adaptive channel tracking technique to address this issue. In particular, we will describe the procedure illustrated in FIG. 14. Block 1410 is a PAM receiver. As it has been previously indicated for FIG. 12, the PAM receiver can be selected from the well known variety of standard PAM receivers such as linear equalizers followed by a decision device, a decision feedback equalizer, a Viterbi algorithm, etc. The purpose of the PAM receiver is to take as an input the aggregate disturbance and produce an estimated PAM symbol sequence. We can use those estimates in a data-aided adaptive algorithm 1430 to track the time-varying co-channels. A possible implementation for the adaptation algorithm is a recursive least squares (RLS) algorithm. Another implementation is a least-mean squares (LMS) algorithm. It will be appreciated by a person of ordinary skills in the art that a rich variety of adaptation algorithms can be implemented in block 1430. The process is illustrated in FIG. 12, where $Y_{dist}(n)$ is the aggregated disturbance signal corrupted by co-channel inter symbol interference (ISI), DMT residue and additive color Gaussian noise, $\tilde{s}(n)$ is the estimated PAM symbol sequence, and $\hat{h}$ is the updated co-channel impulse response.

The tracking procedure can be summarized as follows:

(1) Initialize the co-channel impulse response with the one identified in the initial co-channel identification 608;

(2) Run the PAM receiver and output the estimated PAM symbols $\tilde{s}(n)$;

(3) Run the parameter adaptation algorithm to obtain the estimated channel h;

(4) Provide the estimated $\hat{h}$ to the PAM receiver for use in the next segment of data.

Application of the Present Invention in one Embodiment in an ADSL System

Figure 15:
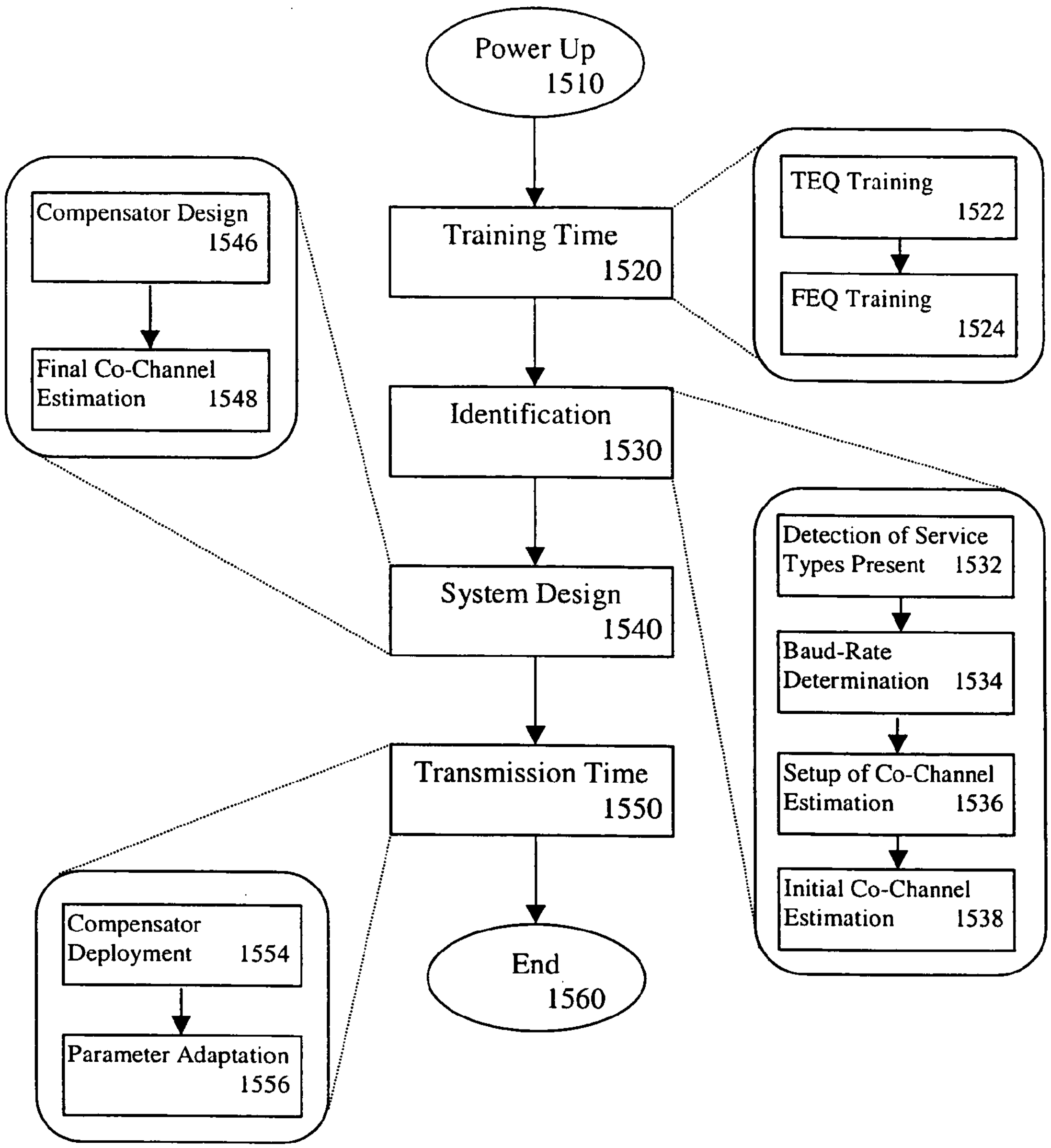
FIG. 15 illustrates where one embodiment of the present invention may be practiced in a DSL modem with crosstalk compensation capability.

FIG. 15 illustrates an example of how the various parts of the identification process may prove useful in an interference compensation device incorporated in an ADSL modem. A typical sequence of events is shown in FIG. 15 starting with initial power being applied to the modem at 1510. Next, the modem will enter a training time 1520, in which tasks such as time equalization (TEQ) training 1522 and frequency equalization (FEQ) training 1524 may occur. Please note that TEQ and FEQ training are standard within an ADSL modem and are shown here to help the reader appreciate and understand where the present invention fits within the overall picture for one embodiment.

After the training time 1520 is completed, the next step is identification 1530 of possible crosstalk sources. Within the identification 1530, may be tasks such as detection of service types present 1532, baud-rate estimation 1534, setup of co-channel estimation 1536 and initial co-channel estimation 1538. After identification 1530 of possible crosstalk sources has been completed, the next step is system design 1540. The system design 1540, may include, for example, such tasks as compensator design 1546, and a final co-channel estimation 1548. For an example of compensator design see co-pending patent application Ser. No. 091710.579 titled "Method and Apparatus for Mitigation of Disturbers in Communication Systems" assigned to the assignee herein and filed on even date herewith.

When system design 1540 of compensation is completed and deployed, the DSL modem may be used for customer-initiated communications at transmission time 1550.

Transmission time 1550, also sometimes referred to as showtime, may include, compensation deployment 1554 and parameter adaptation 1556. For an example of compensation deployment see co-pending patent application Ser. No. 09/710,579 titled "Method and Apparatus for Mitigation of Disturbers in Communication Systems" assigned to the assignee herein and filed on even date herewith.

Part of the modem parameter adaptation 1556 may be accomplished via the channel tracking procedures described in the current invention. Finally, if the modem is turned off we have an end 1560 the operation. The present invention discloses techniques that are applicable to various blocks of FIG. 15, with major emphasis on Identification 1530, Final Co-Channel Estimation 1548, and Parameter Adaptation 1556.

Note that while the operations of FIG. 15 are illustrated as sequential steps, this is not the only embodiment possible. For example, identification 1530 may involve several processes such as detection of service types present 1532 and, for example, baud-rate determination occurring concurrently. Likewise, while at transmission time 1550, a compensation system may be deployed as completed at system design 1540, there is nothing to preclude more identification 1530 of crosstalk sources during transmission time 1550. That is, for example, the identification 1530 may be a batch mode identification or periodically invoked, or even continuous in nature.

Thus, a method and apparatus for identification of interference, such as crosstalk sources, and their coupling channels are disclosed. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of characterization of an interference source of a communication signal in a communication system, the method comprising:

(a) characterizing the interference source by determining the interference source signal type;

(b) estimating the interference signal transmission rate by searching for periodic frequency regions of the communication signal using a sequence of known symbols of the communication signal;

(c) performing a service type identification; and (d) estimating a channel impulse response of the interference signal.

2. The method according to claim 1, wherein searching for periodic frequency regions of the interference signal comprises:

performing a non-linear operation on the communication signal; and performing a Fast Fourier Transform analysis.

3. The method according to claim 2, wherein performing a non-linear operation on the communication signal comprises taking the square value of the communication signal.

4. The method according to claim 1, wherein estimating a channel impulse response comprises using the sequence of known symbols of the communication signal.

5. The method according to claim 4, wherein the sequence of known symbols of the communication signal is a periodic signal with a period equal to a frame length corresponding to the service type.

6. The method according to claim 1, wherein estimating the channel impulse response comprises:

dividing the communication signal in a plurality of frequency regions; and averaging the plurality of frequency regions into an average frame of signal symbols.

7. The method of claim 6, wherein estimating the channel impulse response is performed using the known symbols of the communication signal as an input and the average frame of signal symbols as an output.

8. The method according to claim 1, wherein the interference source is a cross-talk disturber.

9. The method according to claim 1, wherein the interference source comprises a plurality of distinct interference signals.

10. The method according to claim 1, wherein estimating a channel impulse response of the interference signal comprises evaluating a multiple-input, single-output system.

11. The method according to claim 9 further comprising performing steps (b) through (d) for each of the plurality of interference signals.

12. The method according to claim 1, wherein the interference source is a Pulse Amplitude Modulation signal.

13. The method according to claim 1, wherein the interference source is a Quadrature Amplitude Modulation signal.

14. The method according to claim 1, wherein the interference source is a Carrierless Amplitude and Phase Modulation signal.

15. The method according to claim 1, wherein the communication system is a Digital Subscriber Line system.

16. The method according to claim 1, wherein the communication system is a wireless communication system.

17. The method according to claim 1, wherein the communication system is a cable communication system.

18. The method according to claim 1, wherein the communication system is an optical communication system.

19. A method of characterization of an interference source in a communication signal within a communication system, the method comprising:

determining the interference source signal type;

estimating the interference signal transmission rate comprising:

dividing the bandwidth of the communication signal in a plurality of frequency regions;

selecting a plurality of frequency regions by performing a frequency zoom in analysis of the communication signal; and detecting harmonic components of the communication signal for each of the plurality of frequency regions;

performing a service type identification; and estimating a channel impulse response of the interference signal.

20. The method of claim 19, wherein a frequency zoom in analysis comprises:

modulating the communication signal by a nominal frequency; and reducing the bandwidth of the signal to the bandwidth of the frequency region.

21. The method according to claim 20, wherein reducing the bandwidth of the signal comprises a filtering technique.

22. The method according to claim 19, wherein estimating the interference signal transmission rate further comprises:

performing a non-linear operation on the communication signal; and performing a Fast Fourier Transform analysis.

23. The method according to claim 22, wherein performing a non-linear operation on the communication signal comprises taking the square value of the communication signal.

24. The method according to claim 19, wherein estimating a channel impulse response comprises using a sequence of known symbols of the communication signal.

25. The method according to claim 24, wherein the sequence of known symbols of the communication signal is a periodic signal with a period equal to a frame length corresponding to the service type.

26. The method according to claim 19, wherein estimating the channel impulse response comprises:

dividing the communication signal in a plurality of frequency regions; and averaging the plurality of frequency regions into an average frame of signal symbols.

27. The method of claim 26, wherein estimating the channel impulse response is performed using the known symbols of the communication signal as an input and the average frame of signal symbols as an output.

28. The method according to claim 19, wherein interference source is a cross-talk disturber.

29. The method according to claim 19, wherein the interference source comprises a plurality of distinct interference signals.

30. The method according to claim 19, wherein estimating a channel impulse response of the interference signal comprises evaluating a multiple-input, single-output system.

31. The method according to claim 19, wherein the interference source is a Pulse Amplitude Modulation signal.

32. The method according to claim 19, wherein the interference source is a Quadrature Amplitude Modulation signal.

33. The method according to claim 19, wherein the interference source is a Carrierless Amplitude and Phase Modulation signal.

34. The method according to claim 19, wherein the communication system is a Digital Subscriber Line system.

35. The method according to claim 19, wherein the communication system is a wireless communication system.

36. The method according to claim 29, wherein the communication system is a cable communication system.

37. The method according to claim 29, wherein the communication system is an optical communication system.

38. A computer readable medium containing executable instructions which, when executed in a processing system, causes said system to perform a method of characterization of an interference source of a communication signal in a communication system, the method comprising:

(a) characterizing the interference source by determining the interference source signal type;

(b) estimating the interference signal transmission rate by searching for periodic frequency regions of the communication signal using a sequence of known symbols of the communication signal;

(c) performing a service type identification; and (d) estimating a channel impulse response of the interference signal.

39. A computer readable medium containing executable instructions which, when executed in a processing system, causes said system to perform a method of characterization of an interference source of a communication signal in a communication system, the method comprising:

estimating the interference signal transmission rate comprising:

dividing the bandwidth of the communication signal in a plurality of frequency regions;

selecting a plurality of frequency regions by performing a frequency zoom in analysis of the communication signal; and detecting harmonic components of the communication signal for each of the plurality of frequency regions;

performing a service type identification; and estimating a channel impulse response of the interference signal.

40. An article of manufacture comprising a program storage medium readable by a computer and tangibly embodying at least one program of instructions executable by said computer to perform a method of characterization of an interference source of a communication signal in a communication system, the method comprising:

(a) characterizing the interference source by determining the interference source signal type;

(b) estimating the interference signal transmission rate by searching for periodic frequency regions of the communication signal using a sequence of known symbols of the communication signal;

(c) performing a service type identification; and (d) estimating a channel impulse response of the interference signal.

* * * * *

UNITED STATES PATENT AND TRADEMARK OFFICE

CERTIFICATE OF CORRECTION

PATENT NO. : 6,970,415 B1

APPLICATION NO. : 09/710718

DATED : November 29, 2005

INVENTOR(S) : Cecilia Gabriela Galarzaz et al.

It is certified that error appears in the above-identified patent and that said Letters Patent is hereby corrected as shown below:

Column 7, Equation (4) reads " $y_{pam}(n) = y_{pam}(t)|_{i=nT_s} = \sum_j y_j(n)$ " and should read -- $y_{pam}(n) = y_{pam}(t)|_{t=nT_s} = \sum_j y_j(n)$ --.

Column 7, Equation (6) reads "$v(n) = v(t)|_{t=nT,}$" and should read

-- $v(n) = v(t)|_{t=nT_s}$ --.

Column 10, line 64 reads "…[-W, +WM]. It is clear that this frequency range corresponds…" and should read -- …[-W, +W]. It is clear that this frequency range corresponds… --.

Column 11, lines 10-11 read "...assume that for each disturber type the standard specifies fi possible nominal frequencies then the set F defined as…" and should read -- ...assume that for each disturber type the standard specifies $n_i$ possible nominal frequencies then the set F defined as… --.

Column 12, Equation (15) reads $$y_j^{ave}(n) = \frac{1}{N}\sum_{l=0}^{N-1} y_{dist}(n + l\cdot nf_j) \quad n = 0, \ldots, nf_j$$

$n=0, \ldots, nf_j$ and should read -- $y_j^{ave}(n) = \frac{1}{N}\sum_{l=0}^{N-1} y_{dist}(n + l\cdot nf_j) \quad n = 0, \ldots, nf_j$ --.

Column 13, Equation (19) reads, " $y_{id}(n) =_i s^s{}_j(n) * h_j(n)$ " and should read -- $y_{id}(n) =_s s^s{}_j(n) * h_j(n)$ --.

UNITED STATES PATENT AND TRADEMARK OFFICE

CERTIFICATE OF CORRECTION

PATENT NO. : 6,970,415 B1 
APPLICATION NO. : 09/710718
DATED : November 29, 2005
INVENTOR(S) : Cecilia Gabriela Galarzaz et al.

It is certified that error appears in the above-identified patent and that said Letters Patent is hereby corrected as shown below:

Column 13, Equation (19) reads, $$y_{isi_i}(n) = s_j^r(n) * h_j(n) + \sum_m s_m(n) * h_m(n)$$

$$w_j(n) = y_{isi_j}(n) + v(n)$$

$$w_j(n) = y_{isi_j}(n) + v(n)$$

and should read: -- $y_{isi_i}(n) = s_j^r(n) * h_j(n) + \sum_m s_m(n) * h_m(n)$ --.

$$w_j(n) = y_{isi_j}(n) + v(n)$$

Column 13, line 41 reads, "...contribution of the sequence of known symbols $s_s^j(0)$…" and should read -- ...contribution of the sequence of known symbols $s_j^s(0)$… --.

Column 14, line 3 reads, "...order of the models in HI cannot be chosen arbitrarily large." and should read -- ...order of the models in Π cannot be chosen arbitrarily large. --.

Column 15, line 1 reads, "In general, using a 21 order interpolation, h(nTs-IT) has the…" and should read -- In general, using a $2l$ order interpolation, $h(nT_s-lT)$ has the… --.

Column 15, line 14 reads, "...where ΔT = T, -T. Notice that in Equation (22), s(k) is a…" and should read -- ...where $\Delta T = T_s - T$. Notice that in Equation (22), s(k) is a… --.

Column 16, line 15 reads, "...the contribution of the random data in a single term 1E, we…" and should read -- ...the contribution of the random data in a single term ε, we… --.

Column 16, Equation (31), lines 36-39 read, "$y(k)-a_1y(k-1)- \cdots -a_my(k-m)=b_Os(k)+b_1$" and should read -- $y(k)-a_1y(k-1)- \cdots -a_my(k-m)=b_0s(k)+b_1s(k-1) + \cdots +b_ms(k-m)$ --.

UNITED STATES PATENT AND TRADEMARK OFFICE

CERTIFICATE OF CORRECTION

PATENT NO. : 6,970,415 B1
APPLICATION NO. : 09/710718
DATED : November 29, 2005
INVENTOR(S) : Cecilia Gabriela Galarzaz et al.

It is certified that error appears in the above-identified patent and that said Letters Patent is hereby corrected as shown below:

Column 17, line 32 reads, "...tions, it maybe necessary to compute the noise model when…" and should read -- ...tions, it may be necessary to compute the noise model when… --.

Column 19, line 15 reads, "$\Phi(t)= \Phi_O+\delta(t)+ \phi(t)$" and should read -- $\Phi(t)=\Phi_0+\delta(t)+ \varphi(t)$ --.

Column 19, line 17 reads, "...where $\Phi_O$ represents the initial phase offset, $8(t)$ is related to…" and should read -- ...where $\Phi_0$ represents the initial phase offset, $\delta(t)$ is related to… --.

Column 19, line 18 reads, "...frequency deviation and drift, and $\phi$(t) corresponds to the…" and should read -- ...frequency deviation and drift, and $\varphi(t)$ corresponds to the… --.

Column 19, lines 22-23 read, "...the order of 60 ppm (parts-per-million). Variations caused δ(t) and $\phi$(t) pose a serious problem to several applications…" and should read -- ...the order of 60 ppm (parts-per-million). Variations caused by $\delta(t)$ and $\varphi(t)$ pose a serious problem to several applications… --.

Column 19, line 58 reads, "...estimated channel h;" and should read -- ...estimated channel $\hat{\mathbf{h}}$; --.

Column 20, line 20 reads, "...091710.579 titled "Method and Apparatus for Mitigation of…" and should read -- ...09/710,579 titled "Method and Apparatus for Mitigation of… --.

Column 23, Claim 36, line 1 reads, "The method according to claim 29, wherein the…" and should read -- The method according to claim 19, wherein the… --.

Column 23, Claim 37, line 3 reads, "The method according to claim 29, wherein the…" and should read -- The method according to claim 19, wherein the… --.

UNITED STATES PATENT AND TRADEMARK OFFICE

CERTIFICATE OF CORRECTION

PATENT NO. : 6,970,415 B1
APPLICATION NO. : 09/710718
DATED : November 29, 2005
INVENTOR(S) : Cecilia Gabriela Galarzaz et al.

It is certified that error appears in the above-identified patent and that said Letters Patent is hereby corrected as shown below:

Claim No. 41 was omitted in the issued patent, however according to the Supplemental Notice of Allowance dated June 9, 2005, claim 59 should be included and that the claims are numbers 1-41. Applicant requests the following be added:

Column 24, Claim 41, add:
-- 41. An article of manufacture comprising a program storage medium readable by a computer and tangibly embodying at least one program of instruction executable by said computer to perform a method of characterization of an interference source of a communication signal in a communication system, the method comprising:
    estimating the interference signal transmission rate comprising:
        dividing the bandwidth of the communication signal in a plurality of frequency regions;
        selecting a plurality of frequency regions by performing a frequency zoom in analysis of the communication signal; and
        detecting harmonic components of the communication signal for each of the plurality of frequency regions;
    performing a service type identification; and
    estimating a channel impulse response of the interference signal. --

Signed and Sealed this

Seventeenth Day of October, 2006

JON W. DUDAS
*Director of the United States Patent and Trademark Office*